United States Patent
Nakano et al.

[11] Patent Number: 5,907,008
[45] Date of Patent: May 25, 1999

[54] BLACK COLORING COMPOSITION, HIGH HEAT RESISTANCE LIGHT-SHIELDING COMPONENT, ARRAY SUBSTRATE, LIQUID CRYSTAL AND METHOD OF MANUFACTURING ARRAY SUBSTRATE

[75] Inventors: Yoshihiko Nakano, Tokyo; Shuji Hayase, Yokohama; Sawako Fujioka, Tokyo; Takeo Ito, Kumagaya; Satoshi Mikoshiba; Hideo Hirayama, both of Yokohama, all of Japan

[73] Assignee: Kabushiki Kaisha Toshiba, Kawasaki, Japan

[21] Appl. No.: 08/818,877

[22] Filed: Mar. 17, 1997

[30] Foreign Application Priority Data

Mar. 18, 1996 [JP] Japan ................................ 8-060962
Mar. 18, 1996 [JP] Japan ................................ 8-061141
Sep. 6, 1996 [JP] Japan ................................ 8-236742

[51] Int. Cl.$^6$ ..................................................... C08K 3/00
[52] U.S. Cl. ........................... 524/430; 524/431; 524/432; 524/433
[58] Field of Search .................................. 524/430, 431, 524/432, 433

[56] References Cited

U.S. PATENT DOCUMENTS 5,645,752  7/1997  Weiss et al. .......................... 252/62.54

FOREIGN PATENT DOCUMENTS 5-273539  10/1993  Japan .
7-27912   1/1995   Japan .

OTHER PUBLICATIONS

Yuji Yamamoto, et al., "Optical Absorption of Transition Element Oxide–Silica Coating Films Prepared by Sol–Gel Method", Yogyo–Kyokai–Shi, vol. 91, No. 5, 1983, pp. 222–229.

*Primary Examiner*—Edward J. Cain
*Attorney, Agent, or Firm*—Oblon, Spivak, McClelland, Maier & Neustadt, P.C.

[57] ABSTRACT

A black coloring composition comprising, a black inorganic pigment formed of an oxide having an average particle diameter of 0.5 μm or less and comprising at least one kind of metal s elected from metals belonging to Groups 4 to 11 and also to the fourth period, at least one kinds of dispersant selected from the group consisting of polyvinyl butyral resin represented by the following general formula (1), polyacrylic resin represented by the following general formula (2), and a higher carboxylic acid represented by the following general formula (3), and an organic solvent:

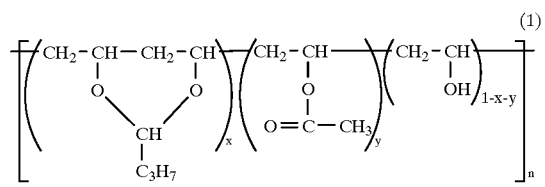

wherein x=0.01 to 0.9, y≦0.05, and n is an integer;

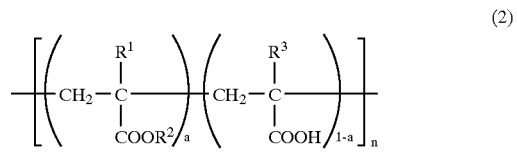

wherein $R^1$ is selected from hydrogen atom, a substituted or unsubstituted aliphatic hydrocarbon group and a substituted or unsubstituted aromatic hydrocarbon group, $R^2$ is selected from a substituted or unsubstituted aliphatic hydrocarbon group and a substituted or unsubstituted aromatic hydrocarbon group, $R^3$ is selected from hydrogen atom, a substituted or unsubstituted aliphatic hydrocarbon group and a substituted or unsubstituted aromatic hydrocarbon group, a=0 to 0.9, and n is an integer;

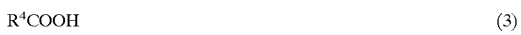

wherein $R^4$ is a substituted or unsubstituted aliphatic hydrocarbon group having 12 or more carbon atoms.

7 Claims, 5 Drawing Sheets

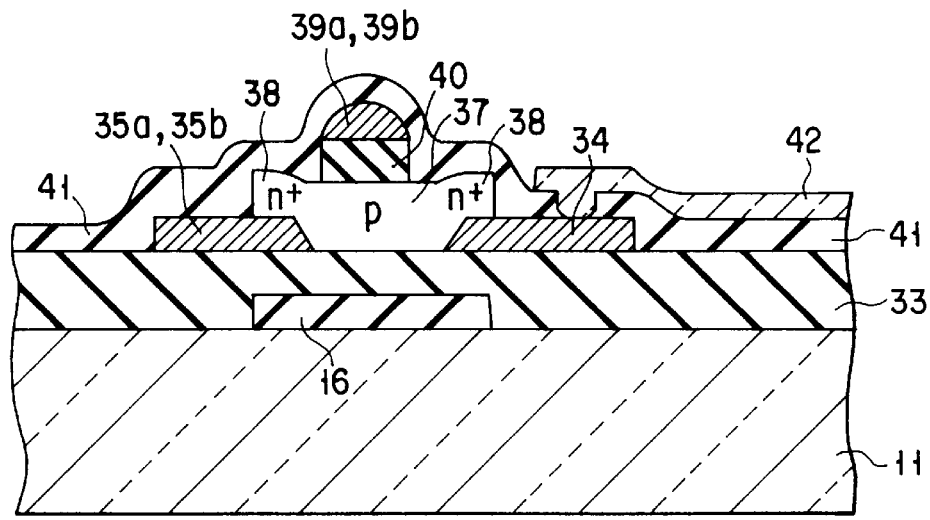
F I G. 6
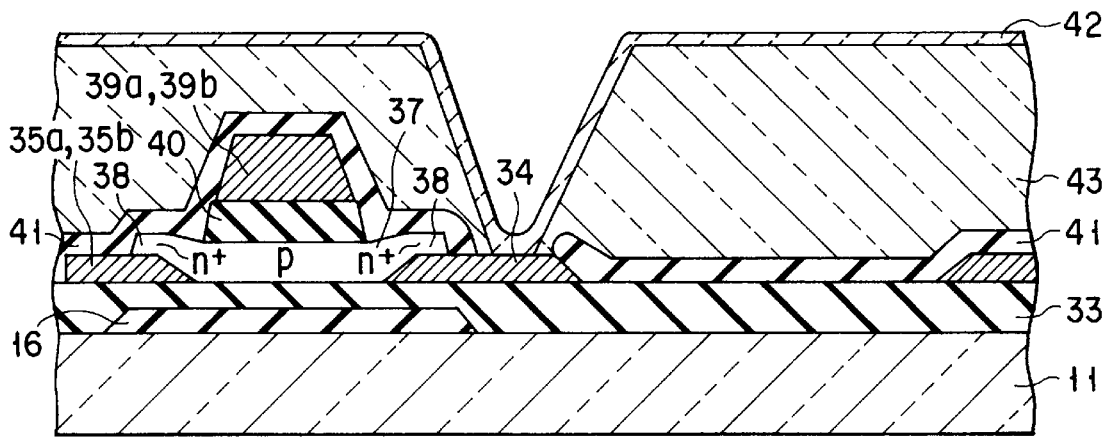
F I G. 7
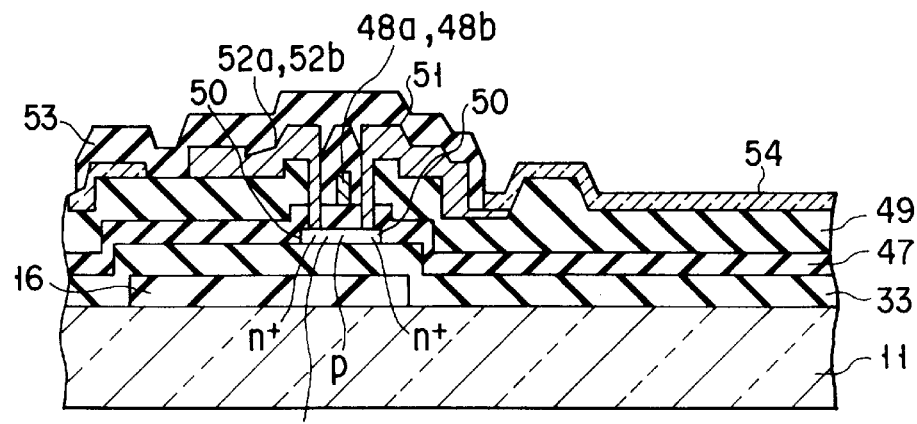
F I G. 8

BLACK COLORING COMPOSITION, HIGH HEAT RESISTANCE LIGHT-SHIELDING COMPONENT, ARRAY SUBSTRATE, LIQUID CRYSTAL AND METHOD OF MANUFACTURING ARRAY SUBSTRATE

BACKGROUND OF THE INVENTION

This invention relates to a black coloring composition which is excellent in coloring property, in adhesivity and in long-term storage stability. This invention also relates to a light-shielding component (or member) excellent in heat resistance and in electric resistance, and in particular to a high heat resistance light-shielding component which is suited for use as a light-shielding film or a black matrix of electronic parts. Further, this invention also relates to a black coloring composition which is useful for the manufacture of a high heat resistance light-shielding component. This invention also relates to an array substrate provided with a light-shielding film formed of the aforementioned high heat resistance light-shielding component and to a method of manufacturing the array substrate. Furthermore, this invention also relates to a liquid crystal display device provided with the array substrate.

In recent years, an active matrix type liquid crystal display element (LCD) wherein a thin film transistor (TFT) employing an amorphous silicon (α-Si) is utilized as a switching element has been taken noticed of and extensively and increasingly employed as a display element of a personal computer, etc. If this α-Si which is capable of forming a film at a low temperature is employed for the manufacture of a TFT array and formed on a cheap glass substrate, a large panel display (a flat type television) which is excellent in fineness and in image quality can be manufactured at a low cost, and a further development of such a TFT array is expected.

If a color liquid crystal display device is to be completely substituted for a CRT (cathode ray tube), the cost for manufacturing a color liquid crystal display device has to be further reduced. However, there is still a great gap in price between a color liquid crystal display device and the CRT. One of main causes for the high price of color liquid crystal display device is the cost for an array substrate. Therefore, it is required for the array substrate, in addition to an improvement of the performance thereof, to reduce the number of manufacturing steps of the array substrate so as to reduce the manufacturing cost thereof.

The conventional color liquid crystal display device is constructed as illustrated in FIG. 1 for instance. Namely, a gate line 72 and a capacity line 79 are formed on a glass substrate 71 and are covered by a gate insulating film 73. On this gate insulating film 73 is formed a TFT comprising an α-Si layer 74, n⁺ α-Si layers 75a and 75b, a source electrode 76a and a drain electrode 76b. The drain electrode 76b is connected with a pixel electrode 78a made of ITO. A passivation film 77 is formed on the pixel electrode 78a in such a manner that a portion of the pixel electrode 78a is exposed therefrom.

On the other hand, on the surface of a substrate 80 which faces to the glass substrate 71, there are successively formed a black matrix 81, a color filter 82 and a counter electrode 83 formed of ITO. Furthermore, a liquid crystal layer 84 is interposed between these substrates 71 and 80, thus forming the color liquid crystal display device. However, when a black matrix is formed on a color filter substrate as in the case of liquid crystal display device shown in FIG. 1, the opening ratio of the display device is restricted thereby making it difficult to realize a high opening ratio. With a view to minimize the matching margin between the array substrate and the color filter substrate so as to increase the opening ratio, there has been recently developed a black matrix-on array substrate where a black matrix is formed on an array substrate.

On the other hand, a liquid crystal display device provided, as a switching element, with a TFT employing a polycrystalline silicon (p-Si) film, which is capable of prominently improving the performance as compared with the conventional α-SiTFT has been proposed.

There are known two kinds of α-SiTFT, i.e. a stagger structure (FIG. 2A) and a reverse-stagger structure (FIG. 2B), which have been utilized as a switching element for a liquid crystal display device. It is reported that the TFT of stagger structure shown in FIG. 2A is more advantageous in reducing the number of manufacturing steps of the array substrate as compared with that of the reverse-stagger structure. However, the α-SiTFT of stagger structure is accompanied with the following problems. Namely, in the case of the α-SiTFT of reverse-stagger structure, a gate electrode 91a and a gate line 91b are disposed below a semiconductor layer 89 with a gate insulating film 90 being interposed therebetween, so that the channel region of TFT between a source electrode 87 and a drain electrode 88 is shielded from a back light, etc. Whereas, in the case of the α-SiTFT of stagger structure, the gate electrode 91a and the gate line 91b are disposed over the semiconductor layer 89, so that the channel region of TFT cannot be shielded from a back light, thus allowing the back light to reach the channel region to thereby generate a photo-leak current in the TFT.

On the other hand, there are known two kinds of structure in the TFT employing a polycrystalline silicon (p-Si) film, i.e. a coplanar structure (FIG. 2C) and a reverse-coplanar structure (FIG. 2D), the TFT of coplanar structure (FIG. 2C) being commonly employed among them. This TFT of coplanar structure is also accompanied with the problem of a photo-leak current due to a leakage of light into the channel region of TFT as in the case of the TFT of stagger structure, since the gate electrode 91a and the gate line 91b are disposed over the semiconductor layer 93.

The aforementioned problem of a photo-leak current in the TFT of stagger structure or of coplanar structure may be overcome by constructing the structure of these TFT elements in such a manner that a black matrix is disposed below the channel region after the black matrix functioning also as a light-shielding film has been formed on a transparent substrate. However, such a light-shielding film which is currently available is accompanied with various problems as illustrated below.

The TFT is generally manufactured through a process involving a high temperature treatment. The temperature involved in the process is 300° C. or more in the case of α-SiTFT and 600° C. or more in the case of p-SiTFT. Therefore, the black matrix (light-shielding film) is required to be heat-resistive to such a high temperature and at the same time to have a high electric resistance ($10^9 \Omega \cdot cm$). Although the employment of materials such as metals (chromium, etc.) and semiconductors (silicon) as a black matrix may be satisfactory as far as the heat resistance is concerned, but these materials are low in electric resistance, so that the following problems would be raised. Namely, if a black matrix is formed by making use of a material which is low in electric resistance, an electric capacitive coupling is generated between the black matrix and a signal line or a source electrode, thus generating a crosstalk in a liquid crystal display device thereby inducing an increase in power consumption and a deterioration in quality of picture image. On the other hand, a black pigment-dispersed resist is high in electric resistance, but a black matrix formed by making use of this black pigment-dispersed resist is defective in that the heat resistance thereof too poor to withstand the processing temperature in the manufacture of a TFT. Namely, a light-shielding film which is high in both electric resistance and heat resistance is not available as yet.

By the way, a black paint or a black ink containing carbon black dispersed therein is now extensively employed. Since carbon black is a highly hydrophobic pigment, a large quantity of a dispersant is required in order to disperse the carbon black in a solvent. Specifically, the quantity of the dispersant required may be no less than that of carbon black in terms of weight or volume, thus limiting the concentration of black color. In particular, when the colorant is to be used as a thin film, a desired black color concentration may not be achieved. Moreover, carbon black is defective in that it is vulnerable to an oxidative decomposition at a high temperature in air atmosphere, thus resulting in a discoloration of carbon black.

Accordingly, an object of the present invention is to provide a black coloring composition which is excellent in coloring property, in adhesivity and in long-term storage stability.

Another object of this invention is to provide a light-shielding component which is high in electric resistance and excellent in heat resistance, and hence suited for use as a light-shielding film or a black matrix of an array substrate.

Another object of this invention is to provide a black coloring composition which is useful for the manufacture of a high-heat resistance light-shielding component.

Another object of this invention is to provide an array substrate which is high in opening ratio and low in power consumption and can be manufactured at a low cost.

Further object of this invention is to provide a liquid crystal display device provided with such an array substrate as mentioned above.

Still another object of this invention is to provide a method of manufacturing an array substrate which is high in opening ratio and low in power consumption at a low cost.

BRIEF SUMMARY OF THE INVENTION

According to this invention, there is provided a black coloring composition comprising a black inorganic pigment formed of an oxide having an average diameter of 0.5 μm or less and comprising at least one kind of metal selected from metals belonging to Groups 4 to 11 and also to the fourth period; at least one kinds of dispersant selected from the group consisting of polyvinyl butyral resin represented by the following general formula (1), polyacrylic resin represented by the following general formula (2), and a higher carboxylic acid represented by the following general formula (3); and an organic solvent.

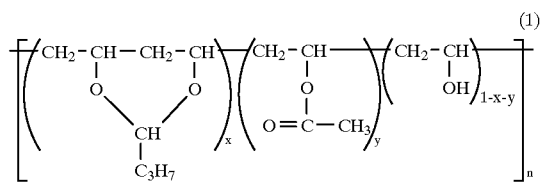
(1)

wherein x=0.01 to 0.9; y≦0.05; and n is an integer.

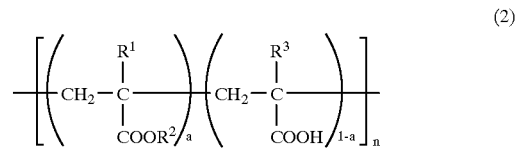
(2)

wherein $R^1$ is selected from hydrogen atom, a substituted or unsubstituted aliphatic hydrocarbon group and a substituted or unsubstituted aromatic hydrocarbon group; $R^2$ is selected from a substituted or unsubstituted aliphatic hydrocarbon group and a substituted or unsubstituted aromatic hydrocarbon group; $R^3$ is selected from hydrogen atom, a substituted or unsubstituted aliphatic hydrocarbon group and a substituted or unsubstituted aromatic hydrocarbon group; a=0 to 0.9; and n is an integer.

wherein $R^4$ is a substituted or unsubstituted aliphatic hydrocarbon group having 12 or more carbon atoms.

According to this invention, there is also provided a black coloring composition comprising a black inorganic pigment formed of a metal oxide comprising at least one kind of metal selected from metals belonging to Groups 4 to 11 and also to the fourth period; an organosilicic high molecular compound represented by the following general formula (7); a dispersant; and an organic solvent.

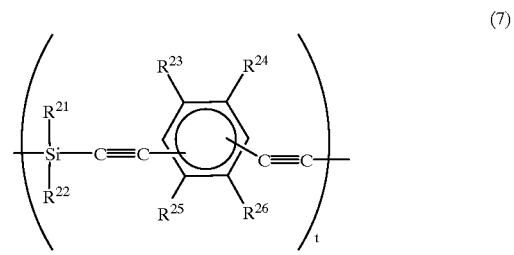
(7)

wherein $R^{21}$, $R^{22}$, $R^{23}$, $R^{24}$, $R^{25}$ and $R^{26}$ may be the same or different and are individually hydrogen atom, a substituted or unsubstituted aliphatic hydrocarbon radical, or a substituted or unsubstituted aromatic hydrocarbon radical; and t is an integer of 2 or more.

A first type of high heat resistance light-shielding component according to this invention is formed of a silicon matrix having an Si—O—Si three-dimensional structure wherein a metal oxide is included as a coloring component. This metal oxide is formed of particles 0.5 μm or less in average particle diameter and comprises at least one kind of metal selected from metals belonging to Groups 4 to 11 and also to the fourth period.

A second type of high heat resistance light-shielding component according to this invention is formed of an inorganic oxide glass comprising at least one kind of oxide selected from aluminum oxide and silicon oxide, wherein a metal oxide constituting a coloring component is included. This metal oxide constituting a coloring component is formed of particles 0.5 μm or less in average particle diameter and comprises at least one kind of metal selected from metals belonging to Groups 4 to 11 and also to the fourth period.

A third type of high heat resistance light-shielding component according to this invention is formed of a silicon carbide matrix of three-dimensional structure including an Si—C bond wherein a metal oxide is included as a coloring component. This metal oxide is formed of particles 0.5 μm or less in average particle diameter and comprises at least one kind of metal selected from metals belonging to Groups 4 to 11 and also to the fourth period.

An array substrate according to this invention is featured in that it comprises a semiconductor layer; a gate electrode formed on the semiconductor layer with an insulating film being interposed therebetween; a pair of source electrode and drain electrode disposed spaced apart from each other on a surface of the semiconductor substrate where the gate electrode is formed or on a surface which faces to the surface of semiconductor substrate; and a pixel electrode connected with the source electrode or the drain electrode; wherein a light-shielding film is disposed below the semiconductor layer and the light-shielding film is formed of a high heat resistance light-shielding component selected from the group consisting of the aforementioned high heat resistance light-shielding components according to the first, second and third aspects of this invention.

The light-shielding film of the array substrate according to this invention can be manufactured by a method comprising the steps of; forming a coated film comprising a precursor of a silicon matrix having an Si—O—Si three-dimensional structure and a metal oxide constituting a coloring component, or a coated film comprising a precursor of an inorganic oxide glass comprising at least one kind of oxide selected from aluminum oxide and silicon oxide, and a metal oxide constituting a coloring component; forming a photoresist film on the coated film; forming a resist pattern by subjecting the photoresist film to a patterned light exposure followed by a developing thereof; forming a pattern of the coated film by patterning the coated film with the resist pattern being employed as a mask; and heating the pattern of coated film to dry the film.

The light-shielding film of the array substrate according to this invention can be manufactured also by a method comprising the steps of; forming a photoresist film on a transparent substrate; forming a resist pattern by subjecting the photoresist film to a patterned light exposure followed by a developing thereof; forming a coated film comprising a precursor of a silicon matrix having an Si—O—Si three-dimensional structure and a metal oxide constituting a coloring component, a coated film comprising a precursor of an inorganic oxide glass comprising at least one kind of oxide selected from aluminum oxide and silicon oxide, and a metal oxide constituting a coloring component, or a coated film comprising an organosilicic high molecular compound represented by the following general formula (7) and a metal oxide constituting a coloring component; forming a pattern of the coated film by removing the resist pattern together with a portion of the coated film deposited on the resist pattern; and heating the pattern of coated film to dry the film.

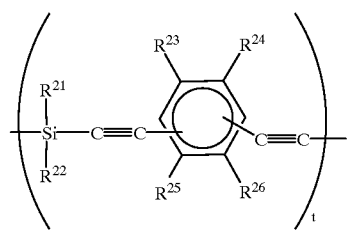

(7)

wherein $R^{21}$, $R^{22}$, $R^{23}$, $R^{24}$, $R^{25}$ and $R^{26}$ may be the same or different and are individually hydrogen atom, a substituted or unsubstituted aliphatic hydrocarbon radical, or a substituted or unsubstituted aromatic hydrocarbon radical; and t is an integer of 2 or more.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 6 is a cross-sectional view illustrating one example of an array substrate according to this invention;

FIG. 7 is a cross-sectional view illustrating another example of an array substrate according to this invention;

FIG. 8 is a cross-sectional view illustrating another example of an array substrate according to this invention;

DETAILED DESCRIPTION OF THE INVENTION

Figure 1:
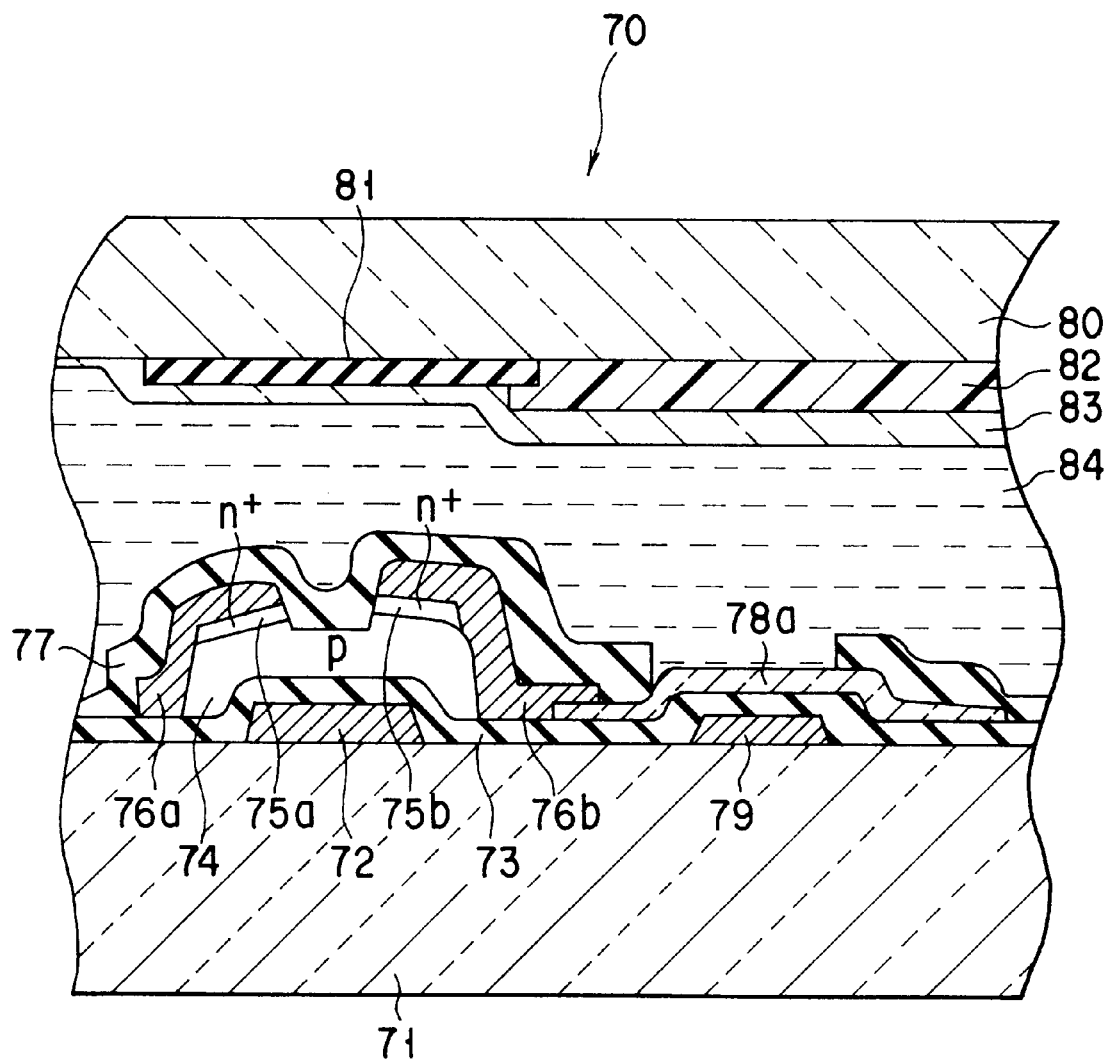
FIG. 1 is a cross-sectional view illustrating one example of the conventional liquid crystal display device.
Figure 2A:
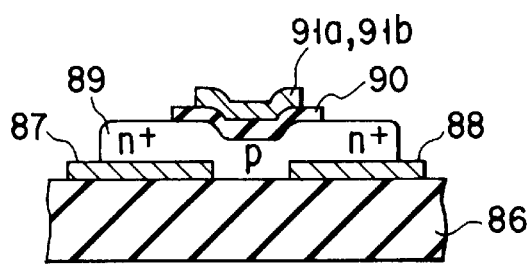
FIGS. 2A to 2D are cross-sectional views each illustrating one example of either an α-SiTFT or p-SiTFT.
Figure 2B:
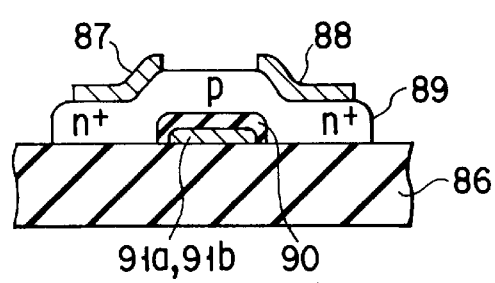
Figure 2C:
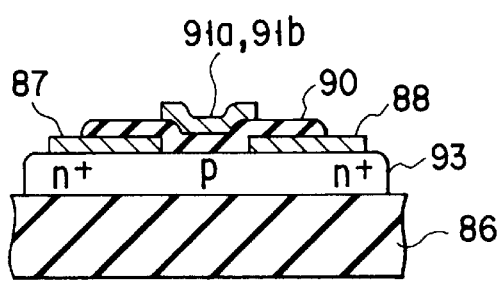
Figure 2D:
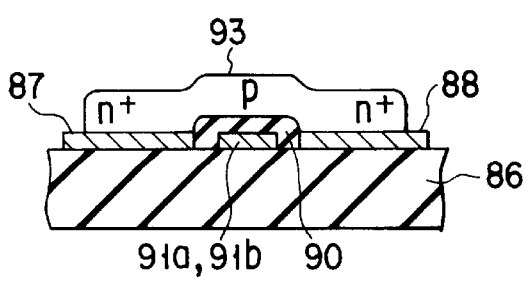

The black inorganic pigment to be employed for the black coloring composition of this invention is capable of absorbing light of visible region (400 to 800 nm in wavelength), thus functioning as a light-shielding component. This black inorganic pigment may be consisted of a single kind of metal selected from metals belonging to Groups 4 to 11 and also to the fourth period (such as Ti, V, Cr, Mn, Fe, Co, Ni and Cu). However, it is preferable in view of obtaining a light-shielding component which exhibits light-shielding effects throughout the entire visible light region to formulate the black inorganic pigment so as to include two or more kinds of metals belonging to Groups 4 to 11 and also to the fourth period. In particular, since the oxides of V, Cr, Mn, Co and Ni are relatively poor in hue as black color if they are employed singly as compared with the oxides of Ti, Fe and Cu, the oxides of V, Cr, Mn, Co and Ni should be suitably combined with other kinds of metal oxide so as to enhance the color purity.

Due to the same reason, a composite oxide containing two or more kinds of metals belonging to Groups 4 to 11 and also to the fourth period is preferable for use as a black inorganic pigment of this invention. There is not any particular limitation to the composite oxide as long as it contains at least two kinds of the aforementioned metals. Specific examples of such a composite metal oxide are Ni—Cu, Cr—Fe, Fe—Cu, Ti—Mn—Cu, Mn—Fe—Cu, Cr—Mn—Cu and Cr—Cu—Fe.

If average particle diameter of particles of these metal oxides or composite metal oxides is larger than 0.5 μm, the quality or hue of a coated film to be obtained by making use of these oxides may be deteriorated. Therefore, the average particle diameter of the these oxides as a black inorganic pigment is limited to 0.5 μm or less in the black coloring composition of this invention. There is any particular limitation as to the particle shape of these oxides, i.e. it may be spherical, scale-like or irregular in shape.

The mixing ratio of the aforementioned black inorganic pigment in a first type of coloring composition of this invention should preferably be limited to 1 to 40% by weight, more preferably 5 to 25% by weight. Because, if the mixing ratio of the black inorganic pigment is less than 1% by weight, it may become difficult to obtain a sufficient optical density as the coloring composition is coated to form a black color film. On the other hand, if the mixing ratio of the black inorganic pigment exceeds over 40% by weight, the fluidity of the coloring composition may be lowered thus deteriorating the film-forming property thereof.

As mentioned above, the dispersant to be mixed with the first type of coloring composition of this invention is selected from the aforementioned general formulas (1), (2) and (3).

In the dispersant represented by the general formula (1), a preferable range of x is from 0.1 to 0.8, while a preferable range of y is from 0 to 0.03. The molecular weight of this polyvinyl butyral resin should preferably be in the range of 500 to 100,000, more preferably 1,000 to 50,000. If the molecular weight of the polyvinyl butyral resin is less than 500, a sufficient effect as a dispersant cannot be expected, while if the molecular weight of the polyvinyl butyral resin exceeds over 100,000, the fluidity of the coloring composition may be lowered thus deteriorating the film-forming property thereof.

Specific examples of $R^1$ in the general formula (2) are hydrogen atom, methyl and ethyl, and specific examples of $R^2$ are methyl, ethyl and butyl. Specific examples of $R^3$ in the general formula (2) are hydrogen atom, methyl and ethyl. The "a" in the general formula (2) should preferably be in the range of 0.1 to 0.8. The molecular weight of this polyacrylic resin should preferably be in the range of 500 to 100,000, more preferably 1,000 to 50,000. If the molecular weight of the polyacrylic resin is less than 500, a sufficient effect as a dispersant cannot be expected, while if the molecular weight of the polyvinyl butyral resin exceeds over 100,000, the fluidity of the coloring composition may be lowered thus deteriorating the film-forming property thereof.

The $R^4$ in the general formula (3) should preferably be selected from unsaturated aliphatic hydrocarbon groups such as heptadekenyl group, heptadecadienyl group and pentadekenyl group in view of the film-forming property. Preferable number of carbon atom in the $R^4$ is in the range of 12 to 30. Because, if the number of carbon atom is less than this lower limit, a sufficient effect as a dispersant cannot be obtained, while if the number of carbon atom larger than the upper limit, the fluidity of the coloring composition may be lowered thus deteriorating the film-forming property thereof.

The mixing ratio of the dispersant represented any of the aforementioned general formulas (1), (2) and (3) should preferably be in the range of 1 to 300 parts by weight, more preferably 10 to 100 parts by weight per 100 parts by weight of a black inorganic pigment. If the mixing ratio of the dispersant is less than this lower limit, the effect of the dispersant cannot be sufficiently exhibited, while if the mixing ratio of the dispersant exceeds over the upper limit, it may become difficult to obtain a sufficient optical density as the coloring composition is coated to form a black color film.

Specific examples of such a dispersant include, among others, polyvinyl butyral resin such as Eslec BL-1 (Sekisui Kagaku Co.), Eslec BLS (Sekisui Kagaku Co.); unsaturated higher carboxylic acid such as oleic acid, stearic acid, erucic acid, palmitic acid, linoleic acid and linolenic acid; and acrylic resin such as Hi-tec 532, Hi-coat FL-200 (Toyo Kagaku Co.), Hiros AW-36 (Seiko Kagaku Kogyo Co.), Primal AC-3494 (Nihon Acryl Co.) and Johncryl J-62 (Johnson Polymer Co.).

As for the organic solvent to be employed in the first type of black coloring composition according to this invention, alcoholic solvents such as methanol, ethanol, isopropyl alcohol, butanol and ethylene glycol monoethyl ether; and ethers such as tetrahydrofuran, ethylene glycol diethyl ether and diethylene glycol diethyl ether can be employed among others. These organic solvents may be used singly or in combination of two or more kinds.

It is also possible to employ a mixed solvent comprising an organic solvent and water. If such a mixed solvent is to be employed, the mixing ratio of an organic solvent may be optionally selected, but preferably the mixing ratio of an organic solvent should be 1 to 1,000 parts by weight per 10 parts by weight of water.

In addition to the aforementioned various components, the first type of black coloring composition of this invention may contain, if required, a little quantity of additives such as a leveling agent, a defoaming agent, a thickening agent, an adhesion-improving agent and a stabilizer.

The first type of black coloring composition of this invention can be manufactured by any desired method after all components such as a black inorganic pigment, a dispersant, an organic solvent and any desired additives such as a leveling agent are combined together. For example, the inorganic pigment may be dispersed into the solvent by means of a ball mill, a sand grind mill (SG mill), an atrantor or a century mill. Any bulky particles of inorganic pigment may be removed by making use of a centrifugal separator after the dispersion step.

It is possible to improve the mechanical strength and adhesivity of a coated film under a high temperature condition where the dispersant may be decomposed or burned (300° C. or more) by adding a metal alkoxide or a decomposition product of metal alkoxide to the pigment-dispersed solution prepared as mentioned above, i.e. the first type of black coloring composition of this invention. Examples of such a metal alkoxide include the metal alkoxide compounds represented by the following general formula (4) and a linear or cyclic oligomer having a polymerization degree of 10 or less and derived from the aforementioned metal alkoxide compounds.

$$R^5_p M^1 (OR^6)_{p-q} \tag{4}$$

wherein $R^5$ is selected from hydrogen atom, a substituted or unsubstituted aliphatic hydrocarbon group and a substituted or unsubstituted aromatic hydrocarbon group; $R^6$ is selected from a substituted or unsubstituted aliphatic hydrocarbon group and a substituted or unsubstituted aromatic hydrocarbon group; $M^1$ is a metal or a metalloid; p is 3 or 4; and q is an integer of 0 to 2.

Examples of the aliphatic hydrocarbon group constituting $R^5$ and $R^6$ include, among others, alkyl group such as methyl, ethyl, propyl, butyl and isobutyl; allyl group such as vinyl; and fluoroalkyl group such as trifluoromethyl and trifluoropropyl. Examples of the aromatic hydrocarbon group constituting $R^5$ and $R^6$ include, among others, aryl group such as phenyl and naphthyl. Examples of $M^1$ include, among others, Al, B, Zr, Ti and Si.

Specific examples of metal alkoxide represented by the aforementioned general formula (4) which are useful in this invention are tetraethoxysilane, tetramethoxysilane, diethoxysilane, methyldiethoxysilane, methyltriethoxysilane, vinyltriethoxysilane, phenyltriethoxysilane, phenylacetoxysilane, 3,3,3-trifluoropropylethoxysilane, aluminum isopropoxide, titanium isopropoxide, zirconium isopropoxide, triethoxysilane, tetraethoxysilane and trimethylborate. The oligomer that can be derived from these metal alkoxide compounds may be silane oligomer or siloxane oligomer if the $M^1$ in the aforementioned general formula (4) is Si. Specific examples of the oligomer include, among others, M silicate (Tama Kagaku Co.), ethyl silicate (Tama Kagaku Co.), pentaethoxy pentmethoxy cyclopentasiloxane, pentamethyl cyclopentasiloxane and silsesquioxane. These metal oxides may be used singly or in combination of two or more.

A metal oxide sol which is a hydrolysate of metal alkoxide can be obtained by adding water and a polar solvent to these hydrolytic metal alkoxide, and allowing a hydrolysis and a partial polycondensation reaction of the metal alkoxide to take place by heating the reaction mixture if required. In this case, a catalyst may be employed in order to accelerate the aforementioned hydrolysis and partial polycondensation reaction.

There is not any particular limitation as for the kinds of the polar solvent, and isopropanol, n-butanol, acetyl acetone or ethyl Cellosolve may be employed. These polar solvents may be used singly or in combination of two or more kinds. The mixing ratio of the polar solvent may be suitably selected, but may preferably be in the range of 1 to 100 parts by weight per one part by weight of water.

As for the catalyst to be employed in this case, an acid catalyst such as hydrochloric acid, nitric acid, phosphoric acid, sulfuric acid and acetic acid; or a basic catalyst such as ammonia and ethanol amine can be employed. The kind and mixing amount of the catalyst can be suitably selected depending on the kind of metal alkoxide to be employed.

The mixing ratio of the metal alkoxide or the decomposition product of the metal alkoxide is generally determined in relative to the amount of the inorganic pigment in the black coloring composition as illustrated hereinafter. In the manufacture of a metal oxide sol, predetermined amounts of water, a polar solvent, a metal alkoxide and, if required, a catalyst are mixed together and allowed to react at a temperature of 40 to 80° C. for 10 to 300 minutes, thereby allowing a hydrolysis and a partial polycondensation reaction of the metal alkoxide to take place, thus obtaining a metal oxide sol. The content of the metal alkoxide or the decomposition product thereof in the metal oxide sol should preferably be in the range of 1 to 70% by weight in view of ensuring a sufficient quantity thereof and maintaining the fluidity of the metal oxide sol.

The first type of coloring composition of this invention containing at least one kind of compound selected from a metal alkoxide and the decomposition product thereof can be prepared by the following method. Namely, predetermined amounts of water, a polar solvent, a metal alkoxide and, if required, a catalyst are added directly to a pigment-dispersed solution, i.e. a black coloring composition prepared in advance and then the resultant mixed solution is allowed to undergo hydrolysis and partial polycondensation reaction. Alternatively, a solution of metal oxide sol is prepared separately and then mixed with a pigment-dispersed solution, i.e. a black coloring composition thereby to prepare a black coloring composition containing the metal oxide sol.

In any case, the content of the metal alkoxide or the decomposition product thereof should preferably be in the range of 1 to 400 parts by weight, more preferably 20 to 200 parts by weight per 100 parts by weight of the inorganic pigment. If the content of the metal alkoxide or the decomposition product thereof is less than 1 part by weight, the effect of the metal alkoxide or the decomposition product thereof becomes insufficient, whereas if the content of the metal alkoxide or the decomposition product thereof exceeds over 400 parts by weight, it may become difficult to obtain a coated film having a desired light-shielding property.

The black coloring composition of this invention may be coated on a substrate such as a transparent substrate by means of spin coating or dipping method, and the resultant coated layer is dried to form a black film. Since a black inorganic pigment 0.5 $\mu$m in average particle diameter and formed of an oxide containing a metal or metals as mentioned above is incorporated into the coloring composition of this invention, it is possible to manufacture a black film which is deep in hue of black color and excellent in color purity.

The black inorganic pigment in the first type of black coloring composition can be employed as a coloring component in the first and second types of high heat resistance light-shielding component.

Followings are detailed explanations on the first and second types of high heat resistance light-shielding component.

The first type of high heat resistance light-shielding component according to this invention is formed of a silicon matrix having an Si—O—Si three-dimensional structure wherein the aforementioned metal oxide is included as a coloring component. On the other hand, the second type of high heat resistance light-shielding component according to this invention is formed of an inorganic oxide glass comprising at least one kind of oxide selected from aluminum oxide and silicon oxide, wherein a metal oxide as mentioned above is included as a coloring component.

The mixing ratio of the metal oxide in these high heat resistance light-shielding components should preferably be in the range of 3.0 to 90% by weight, more preferably in the range of 5 to 25% by weight. If the mixing ratio of the metal oxide is less than 3.0% by weight, it is difficult to obtain a film of sufficient light-shielding property, whereas if the mixing ratio of the metal oxide exceeds over 90% by weight, it is difficult to obtain a light-shielding layer having a sufficiently high electric resistance.

The silicon matrix having an Si—O—Si three-dimensional structure in the first type of the high heat resistance light-shielding component can be formed by employing, as a precursor, a silicon-based high molecular compound which can be obtained by the hydrolysis and partial polycondensation of at least one kind of silane compound selected from silanes having a hydrolytic group represented by the following general formula (5), or by the hydrolysis and partial polycondensation of linear or cyclic silane or siloxane oligomer having a polymerization degree of 10 or less and derived from the aforementioned silane compound.

$$R^{11}R^{12}R^{13}R^{14}Si \qquad (5)$$

wherein $R^{11}$ and $R^{12}$ are individually a hydrolytic group; $R^{13}$ and $R^{14}$ are individually hydrogen atom, a substituted or unsubstituted alkyl group, aryl group, allyl group or a hydrolytic group, with the proviso that at least one of $R^{13}$ and $R^{14}$ is hydrogen atom or a hydrolytic group.

Examples of $R^{11}$ and $R^{12}$ include, among others, hydrolytic groups such as alkoxy group. Examples of $R^{13}$ and $R^{14}$ include, among others, hydrogen atom; alkyl group such as methyl, ethyl and propyl; allyl group such as vinyl; aryl group such as phenyl and naphthyl; fluoroalkyl group such as trifluoromethyl and trifluoropropyl; and a hydrolytic group such as alkoxy group. It is preferable in view of obtaining a light-shielding component of high heat resistance and high electric resistance to employ methoxy group and ethoxy group as $R^{11}$ and $R^{12}$, and to employ hydrogen atom, methyl group, methoxy group and ethoxy group as $R^{13}$ and $R^{14}$.

Specific examples of silane compound having a hydrolytic group represented by the aforementioned general formula (5) include, among others, tetraethoxysilane, tetramethoxysilane, diethoxysilane, methyldiethoxysilane, triethoxysilane, methyltriethoxysilane, vinyltriethoxysilane, phenyltriethoxysilane, phenylacetoxysilane, and 3,3,3-trifluoropropylethoxysilane. Examples of the silane oligomer or siloxane oligomer that can be derived from these silane compounds include, among others, M silicate 51 (Tama Kagaku Co.), ethyl silicate 45 (Tama Kagaku Co.), pentaethoxy pentmethoxy cyclopentasiloxane, pentamethyl cyclopentasiloxane and silsesquioxane. These silane compounds having a hydrolytic group, or the silane or siloxane oligomers to be derived from these silane compounds may be used singly or in combination of two or more.

A solution of a silicon-based high molecular compound which is a precursor of the silicon-based matrix having an Si—O—Si three-dimensional structure can be obtained by adding water and a polar solvent to the silane compound having a hydrolytic group, and by allowing a hydrolysis and a partial polycondensation reaction of the silane compound to take place by heating the reaction mixture if required. In this case, a catalyst may be employed in order to accelerate the aforementioned hydrolysis and partial polycondensation reaction.

There is not any particular limitation as for the kinds of the polar solvent, and isopropanol, n-butanol, acetyl acetone or ethyl Cellosolve may be employed. These polar solvents may be used singly or in combination of two or more kinds. The mixing ratio of the polar solvent may be suitably selected, but may preferably be in the range of 0.1 to 1,000 parts by weight per one part by weight of water.

As for the catalyst to be employed in this case, an acid catalyst such as hydrochloric acid, nitric acid, phosphoric acid, sulfuric acid and acetic acid; or a basic catalyst such as ammonia and ethanol amine can be employed. The kind and mixing amount of the catalyst can be suitably selected depending on the kind of silane compound to be employed.

In the manufacture of a solution of the silicon-based high molecular compound, predetermined amounts of the aforementioned components are mixed with the silane compound having a hydrolytic group and allowed to react at a temperature of 40 to 80° C. for 10 to 300 minutes, thereby allowing a hydrolysis and a partial polycondensation reaction of the silane compound to take place, thus obtaining the solution of the silicon-based high molecular compound. The molecular weight of the silicon-based high molecular compound to be obtained in this manner should preferably be in the range of 500 to 100,000. If the molecular weight of the silicon-based high molecular compound is less than 500, it may become difficult to form a coated layer when the high heat resistance light-shielding component is applied to the formation of light-shielding film of an array substrate. On the other hand, if the molecular weight of the silicon-based high molecular compound exceeds over 100,000, the fluidity of the resultant solution may be deteriorated.

A raw material composition for manufacturing the first type of light-shielding component comprising a silicon-based matrix of three-dimensional structure composed of Si—O—Si bonds and a metal oxide contained as a coloring component in the silicon-based matrix is composed of a solution comprising a silicon-based high molecular compound as a precursor of the aforementioned silicon-based matrix and a metal oxide as a coloring component. This raw material composition can be manufactured by the following method. Namely, predetermined amounts of water, a polar solvent, a silane compound having a hydrolytic group and, if required, a catalyst are added directly to a pigment-dispersed solution prepared in advance and then the resultant mixed solution is allowed to undergo hydrolysis and partial polycondensation reaction. Alternatively, a solution of silicon-based high molecular compound is prepared separately and then mixed with a pigment-dispersed solution, thereby to prepare the raw material composition containing the color component and the silicon-based high molecular compound.

The dispersion containing a color component can be prepared by dispersing the aforementioned metal oxide in water or an organic solvent. Examples of such an organic solvent are a substituted aromatic hydrocarbon type solvent such as toluene, xylene, ethylbenzene and cumene; an ether type solvent such as tetrahydrofuran, ethylene glycol diethyl ether and diethylene glycol diethyl ether. These solvents may be used singly or in combination of two or more kinds, or used in the form of a mixed solvent together with water.

The metal oxide should preferably be dispersed in a solvent by making use of a suitable dispersant. The mixing ratio of the dispersant can be optionally determined, but preferably selected from the range of 1 to 300 parts by weight per 100 parts by weight of the metal oxide.

The content of the silicon-based high molecular compound in the raw material composition should preferably be in the range of 1 to 400 parts by weight, more preferably 20 to 200 parts by weight per 100 parts by weight of the color component. If the content of the silicon-based high molecular compound is less than 1 part by weight, the effect of the silicon-based high molecular compound becomes insufficient, whereas if the content of the silicon-based high molecular compound exceeds over 400 parts by weight, it may become difficult to obtain a coated film having a desired light-shielding property.

This raw material composition may contain, for the purpose of improving the quality of a coated film, a little quantity of additives such as a leveling agent, a defoaming agent, an adhesion-improving agent, etc.

The inorganic oxide glass composed of at least one kind of metal oxide selected from aluminum oxide and silicon oxide in the second type of the high heat resistance light-shielding component can be obtained by employing, as a precursor, a metal oxide sol which can be obtained by the hydrolysis and partial polycondensation of a metal alkoxide represented by the following general formula (6).

$$R^{13}{}_s M^{11}(OR^{14})_{r-s} \qquad (6)$$

wherein $R^{13}$ is hydrogen atom or a substituted or unsubstituted alkyl group; $R^{14}$ is a substituted or unsubstituted alkyl group; r is 2 or 4; s is 0 or 1; and $M^{11}$ is Al or Si.

Examples of $R^{13}$ includes, among others, methyl, ethyl and propyl. These alkoxides may be used singly or in combination of two or more kinds. It is possible in this second type of heat resistant light-shielding component to co-use a metal alkoxide wherein the $M^{11}$ in the aforementioned general formula (6) is not Al or Si but B, Zr or Ti. However, the content of such an alkoxide containing a metal other than aluminum and silicon should be limited to not more than 50% by weight based on the total amount of metal alkoxide. Because, if the content of such an alkoxide exceeds over 50% by weight, it may be difficult to obtain a light-shielding component of sufficiently high electric resistance.

Specific examples of metal alkoxide represented by the aforementioned general formula (6) include, among others, aluminum isopropoxide, triethoxysilane and tetraethoxysilane. Examples of alkoxide of B, Zr or Ti are titanium isopropoxide, zirconium isopropoxide and triethyl borate.

A metal oxide sol which is a precursor of an inorganic oxide glass composed of at least one kind of metal oxide selected from aluminum oxide and silicon oxide can be obtained by adding water and a polar solvent to these metal alkoxide, and allowing a hydrolysis and a partial polycondensation reaction of the metal alkoxide to take place by heating the reaction mixture if required. In this case, a catalyst as explained above may be employed in order to accelerate the aforementioned hydrolysis and partial polycondensation reaction.

A raw material composition for manufacturing the second type of heat resistant light-shielding component can be manufactured in the same manner as in the case of a raw material for manufacturing the first type of heat resistant light-shielding component except that the silane compound having a hydrolytic group is replaced by a metal alkoxide represented by the aforementioned general formula (6).

The light-shielding component of this invention can be obtained by the steps of coating a raw material composition obtained as illustrated above on a substrate, drying the coated layer, and heating the coated layer. There is not any particular limitation regarding the kind of substrate, i.e. any substrate which requires a light-shielding may be employed. For example, a transparent substrate can be employed. The coating of the raw material composition on a transparent substrate can be performed by means of a spin coating or dipping method.

When a film coated on a substrate is heated, the polycondensation of silanol (Si—OH) in the silicon-based high molecular compound is proceeded in first type light-shielding component, thereby forming a silicon-based matrix of three-dimensional structure composed of Si—O—Si bonds. Likewise, in the case of the second type light-shielding component, the polycondensation of a metal oxide sol is proceeded, thereby forming an inorganic oxide glass as a result of polymerization of the sol. Accordingly, a light-shielding component exhibiting a high electric resistance and a high heat resistance, and containing a color component in the silicon-based matrix or in the inorganic oxide glass can be obtained.

The light-shielding component according to this invention which can be manufactured in the aforementioned manner may contain, in addition to Al, Si, O and metals belonging to Groups 4 to 11 and also to the fourth period, carbon atom, hydrogen atom, etc. each originating from the hydrocarbon group in a silane compound represented by the general formula (5) or in a metal alkoxide represented by the general formula (6). However, the content of such an element should preferably be limited to less than 50% by weight.

If the light-shielding component of this invention is to be applied as a light-shielding film to electronic parts, the thickness of the light-shielding film should preferably be 2 $\mu$m or less. Especially in the case where the light-shielding component of this invention is to be applied as a light-shielding film for shielding the channel region of a TFT from light in an array substrate, the thickness of the light-shielding film after baking thereof should preferably be 0.5 $\mu$m or less. In this case, with a view of ensuring the absorption of light of wide wavelength region, the employment, as a color component, of an oxide comprising a plural kinds of metal as mentioned above is preferable.

The heating temperature of the coated film can be determined taking the kind of base material, the end-use, etc. into consideration. For example, when the light-shielding component of this invention is to be utilized as a light-shielding film of an $\alpha$-SiTFT, the heating temperature should be in the range of 300 to 400° C., while when the light-shielding component of this invention is to be utilized as a light-shielding film of a p-SiTFT, the heating temperature should be in the range of 400 to 650° C.

The film coated on a substrate can be formed into a predetermined pattern by means of photolithography or photoetching method before the film is baked. In this case, a resist which is sensitive to i-line or g-line, e.g. a resist for alkali development or a water-soluble resist can be employed. As for the developing solution, an aqueous alkaline solution can be employed. As for the etching solution useful in this case, an acid such as HF, BHF, HCl, $H_2SO_4$ and $HNO_3$; a base such as KOH, NaOH, $NH_2NH_2$ and $NH_2OH$; a salt such as $NH_4F$, NaF and KF; or a mixed solution of any of these acids and salts may be employed. Among them, a base such as KOH, NaOH, $NH_2NH_2$ and $NH_2OH$; as well as a mixed solution comprising any one of these base and a fluoride such as NaF and KF are preferable for use, since a developing solution comprising any one of these compounds can be used also as a developing solution.

The coated film of the raw material composition for a light-shielding component of this invention which is patterned in this manner is then washed, if required, and heated to obtain a patterned light-shielding component. When the coated film is formed on the top surface of a glass substrate, the back surface of the glass substrate should preferably be covered with an etch-resistant protective material at this occasion of performing the etching of the coated film with a resist pattern being employed as an etching mask.

In the above explanations on the manufacture of the light-shielding component of this invention, the light-shielding component is formed by coating a solution of raw material composition on the surface of substrate. However, the manufacture of the light-shielding component of this invention is not confined to the aforementioned method. For example, at least one kind of organometallic complex comprising a metal or metals selected from metals belonging to Groups 4 to 11 and also to the fourth period may be deposited, together with a compound represented by the general formula (5) or (6), on a substrate by means of a sputtering method or a CVD (including a plasma CVD) method.

Examples of the organometallic complex comprising such a metal or metals are an olefin-$\pi$ complex, a $\eta^6$ arene complex, a π-allyl complex, a cyclopentadienyl complex, an alkyl transition metal complex, an allyl transition metal complex, a carbene complex, a carbine complex, a hydride complex and a carbonyl complex. Specific examples of these complexes include, among others, manganese acetylacetonate, copper acetylacetonate, iron acetylacetonate, dicyclopentadienyl manganese, ferrocene, iron carbonyl, cobalt acetylacetonate, nickel acetylacetonate, chromium carbonyl and chromium acetylacetonate.

The film formed on a substrate in this manner is then heated thereby to form the light-shielding component containing a black metal oxide incorporated into a silicon-based matrix having an Si—O—Si three-dimensional structure or into an inorganic oxide glass comprising at least one kind of oxide selected from aluminum oxide and silicon oxide.

The patterning of this light-shielding component may be performed prior to the heat treatment.

By the way, the first type of light-shielding component according to this invention is formed of a silicon matrix having an Si—O—Si three-dimensional structure wherein the aforementioned metal oxide is included as a coloring component. On the other hand, the second type of light-shielding component according to this invention is formed of an inorganic oxide glass comprising at least one kind of oxide selected from aluminum oxide and silicon oxide, wherein a metal oxide as mentioned above is included as a coloring component. Therefore, these light-shielding components are characterized in that they have a sufficient optical density, i.e. about 1.0 or more; a high electric resistance, i.e. about $10^9$ Ω·cm or more; and a high heat resistance, i.e. endurable to a high temperature process of 300° C. or more. Therefore, if the array substrate according to this invention which is provided with a aforementioned light-shielding component as a light-shielding film, as well as a liquid crystal display device provided with such an array substrate are employed, it is possible to achieve a low power consumption due to the high electric resistance of the light-shielding film. Moreover, it is possible according to the array substrate of this invention to form a light-shielding film which is functioning also as a black matrix, so that it is possible to ensure a high opening ratio.

Followings are explanations on the second type of black coloring composition of this invention.

The black inorganic pigment to be employed in this second type of black coloring composition may be the same kinds of metal oxides as in the case of the first type of black coloring composition. The average particle diameter of the black inorganic pigment useful in this second type of black coloring composition should preferably be 0.5 μm or less due to the same reasons as illustrated with reference to the first type of black coloring composition. There is not any particular restriction regarding the shape of particles.

The mixing ratio of the metal oxide in the second type of black coloring composition should preferably be in the range of 3.0 to 90% by weight, more preferably in the range of 5 to 25% by weight. If the mixing ratio of the metal oxide is less than 3.0% by weight, it is difficult to obtain a film of sufficient light-shielding property, whereas if the mixing ratio of the metal oxide exceeds over 90% by weight, it is difficult to obtain a light-shielding layer having a sufficiently high electric resistance.

Examples of $R^{21}$, $R^{22}$, $R^{23}$, $R^{24}$, $R^{25}$ and $R^{26}$ in the organosilicic high molecular compound represented by the general formula (7) to be contained in the second type of black coloring composition include, among others, hydrogen atom, methyl, ethyl, vinyl, phenyl, naphthyl, and fluoroalkyl group such as trifluoromethyl and trifluoropropyl. It is preferable to employ, as $R^{21}$ and $R^{22}$, phenyl group in view of obtaining a light-shielding component of high heat resistance and high electric resistance, or hydrogen atom in view of obtaining a light-shielding component having a strong network and an improved heat resistance. As for $R^{23}$, $R^{24}$, $R^{25}$ and $R^{26}$, the employment of hydrogen atom is preferable in view of obtaining a light-shielding component having a strong network and an improved heat resistance, but the employment of methyl, vinyl and ethylene therefor is also preferable.

The organosilicic high molecular compound represented by the general formula (7) can be synthesized by the methods which are disclosed for example in Japanese Patent Unexamined Publication Hei/2-289588 or The 29th Organosilicon Symposium, March 22–23, 1996, A-3.

According to the method disclosed in Japanese Patent Unexamined Publication Hei/2-289588, a substituted or unsubstituted diethylbenzen and a silane represented by the formula; $R_{4-u}SiH_u$ (u=2 or 3) are allowed to be polycondensed in toluene by making use of magnesium oxide as a catalyst, then the catalyst is filtered off, and oligomer remaining in the reaction mixture is removed by means of hexane-washing to obtain an aimed polymer. On the other hand, according to the method disclosed in the latter publication; the 29th Organosilicon Symposium, a substituted or unsubstituted diethylbenzen and a dichlorosilane compound represented by the formula; $R_2SiCl_2$ are allowed to be polycondensed in acetonitrile by making use of zinc or lead power as a catalyst, then precipitates are filtered off, and, after resultant product is washed with water to remove salts, oligomer remaining in the reaction mixture is removed by means of hexane-washing to obtain an aimed polymer.

The molecular weight of this organosilicic high molecular compound should preferably be in the range of 1,000 to 1,000,000. If the molecular weight of the organosilicic high molecular compound is less than 1,000, it may become difficult to form a coated layer when the heat resistance light-shielding component is applied to the formation of light-shielding film of an array substrate. On the other hand, if the molecular weight of the organosilicic high molecular compound exceeds over 1,000,000, the fluidity of the resultant solution may be deteriorated.

These organosilicic high molecular compounds may be employed singly or in combination of two or more kinds.

The mixing ratio of the organosilicic high molecular compound in the second type of black coloring composition of this invention should preferably be in the range of 1 to 400 parts by weight, more preferably 10 to 200 parts by weight per 100 parts by weight of the color component. If the mixing ratio of the organosilicic high molecular compound is less than 1 part by weight, the effect of the organosilicic high molecular compound becomes insufficient, whereas if the mixing ratio of the organosilicic high molecular compound exceeds over 400 parts by weight, it may become difficult to obtain a coated film having a desired light-shielding property.

The black coloring composition of this invention may contain, in addition to the organosilicic high molecular compound represented by the general formula (7), an organic compound having at least two bonds selected from C—C multiple bond (double bond or triple bond) and Si—H bond. Specific examples of such an organic compound include, among others, divinylbenzene, diethynylbenzen, ethynylphenylsilane, vinylphenylsilane, phenylsilane, trivinylbenzene and tetravinylbenzene.

Since these organic compounds function as a crosslinking agent for the organosilicic high molecular compound represented by the general formula (7), the physical properties of the resultant film would be improved by the addition of such an organic compound.

The mixing ratio of these organic compounds should preferably be limited to the range of 0.01 to 50 parts by weight per 100 parts by weight of the organosilicic high molecular compound. If the mixing ratio of these organic compounds is less than 0.01 part by weight per 100 parts by weight of the organosilicic high molecular compound, the crosslinking effect by these organic compounds may become insufficient, whereas if the mixing ratio of these organic compounds exceeds over 50 parts by weight, the film-coating property of the coloring composition may be deteriorated.

The black coloring composition of this invention may also contain a radical-generating agent in order to accelerating the crosslinking reaction of the organosilicic high molecular compound represented by the general formula (7). Examples of such a radical-generating agent include an organic peroxide and an organic azo compound. The mixing ratio of such a radical-generating agent should preferably be limited to the range of 0.01 to 10 parts by weight per 100 parts by weight of the organosilicic high molecular compound.

The second type of black coloring composition of this invention is composed of a solution comprising the aforementioned silicon-based high molecular compound and a metal oxide as a coloring component. This black coloring composition can be manufactured by the following method. Namely, the organosilicic high molecular compound represented by the general formula (7) is added directly to a colorant-dispersed solution prepared in advance. Alternatively, a solution of the organosilicic high molecular compound is prepared separately and then mixed with a colorant-dispersed solution, thereby to prepare the raw material composition containing the color component and the organosilicic high molecular compound.

The dispersion containing a color component can be prepared by dispersing the aforementioned metal oxide in an organic solvent. Examples of such an organic solvent include, among others, a substituted aromatic hydrocarbon type solvent such as toluene, xylene, cumene and ethylbenzene; an ether type solvent such as tetrahydrofuran, ethylene glycol diethyl ether and diethylene glycol diethyl ether. These solvents may be used singly or in combination of two or more kinds.

The metal oxide should preferably be dispersed in a solvent by making use of a suitable dispersant. The mixing ratio of the dispersant can be optionally determined, but preferably selected from the range of 1 to 300 parts by weight per 100 parts by weight of the metal oxide. Examples of such a dispersant are higher aliphatic ester, polyglyceline aliphatic ester and unsaturated higher carboxylic acid.

As for the organic solvent for dissolving the organosilicic high molecular compound, toluene, xylene or tetrahydrofuran can be employed.

If required for the purpose of improving the quality of film, a little quantity of additives such as a leveling agent, a defoaming agent and an adhesion-improving agent may be added to the second type of black coloring composition of this invention.

Since this second type of black coloring composition contains a black inorganic pigment formed of an oxide containing the aforementioned metal or metals, it is possible to manufacture a black film which is deep in hue of black color and excellent in color purity.

The third type of light-shielding component of this invention can be obtained by heating a coated film which has been formed as explained above. Specifically, it can be obtained by coating a black coloring composition obtained as illustrated above on a substrate, and then heating the coated layer after drying the coated layer. There is not any particular limitation regarding the kind of substrate, i.e. any substrate which requires a light-shielding may be employed. For example, a transparent substrate can be employed. The coating of the black coloring composition on a transparent substrate can be performed by means of a spin coating or dipping method.

When a film coated on a substrate is heated, the addition polymerization of Si—H or —C≡C— in the silicone-based high molecular compound is proceeded in this third type light-shielding component, thereby forming a silicon carbide-based matrix of three-dimensional structure containing an Si—C bond. As for the examples of three-dimensional matrix containing an Si—C bond, they include, among others, Si—C—Si bond and Si—C—C—Si bond. Accordingly, it is possible to obtain a light-shielding component comprising the aforementioned silicon carbide-based matrix containing a color component therein, the light-shielding component being high in electric resistance and in heat resistance.

The third type light-shielding component according to this invention which can be manufactured in the aforementioned manner may contain, in addition to Si, C and metals belonging to Groups 4 to 11 and also to the fourth period, other kinds of element. However, the content of such an element should preferably be limited to less than 10% by weight.

If the third type light-shielding component of this invention is to be applied as a light-shielding film to electronic parts, the thickness of the light-shielding film should preferably be 2 $\mu$m or less. Especially in the case where this third type light-shielding component is to be applied as a light-shielding film for shielding the channel region of a TFT from light in an array substrate, the thickness of the light-shielding film after baking thereof should preferably be 0.5 $\mu$m or less. In this case, with a view of ensuring the absorption of light of wide wavelength region, the employment, as a color component, of an oxide comprising a plural kinds of metal as mentioned above is preferable.

The heating temperature of the coated film can be determined taking the kind of base material, the end-use, etc. into consideration. For example, when this third type light-shielding component of this invention is to be utilized as a light-shielding film of an $\alpha$-SiTFT, the heating temperature should be in the range of 300 to 400° C., while when this third type light-shielding component of this invention is to be utilized as a light-shielding film of a p-SiTFT, the heating temperature should be in the range of 400 to 650° C.

The film coated on a substrate can be formed into a predetermined pattern by means of photolithography or photoetching method before the film is baked. In this case, a resist which is sensitive to i-line or g-line, e.g. a resist for alkali development or a water-soluble resist can be employed. As for the developing solution, an aqueous alkaline solution can be employed. As for the etching solution useful in this case, an acid such as HF, BHF, HCl, $H_2SO_4$ and $HNO_3$; a base such as KOH, NaOH, $NH_2NH_2$ and $NH_2OH$; a salt such as $NH_4F$, NaF and KF; or a mixed solution of any of these acids and salts may be employed. Among them, a base such as KOH, NaOH, $NH_2NH_2$ and $NH_2OH$; as well as a mixed solution comprising any one of these base and a fluoride such as NaF and KF are preferable for use, since a developing solution comprising any one of these compounds can be used also as a developing solution.

The coated film of the second type black coloring composition which is patterned in this manner is then washed, if required, and heated to obtain a patterned light-shielding component. When the coated film is formed on the top surface of a glass substrate, the back surface of the glass substrate should preferably be covered with an etch-resistant protective material at this occasion of performing the etching of the coated film with a resist pattern being employed as an etching mask.

The film formed on a substrate in this manner is then heated thereby to form a light-shielding component of this invention which contains a black metal oxide incorporated into a silicon carbide-based matrix of three-dimensional structure containing the Si—C bond.

The patterning of this light-shielding component may be performed prior to the heat treatment.

By the way, this third type light-shielding component according to this invention is formed of a silicon carbide-based matrix having an Si—C bond-containing three-dimensional structure wherein the aforementioned metal oxide is included as a coloring component. Therefore, this light-shielding component has excellent features, as in the cases of the first and second light-shielding components, that it has a sufficient optical density, i.e. about 1.0 or more; a high electric resistance, i.e. about $10^9 \Omega \cdot cm$ or more; and a high heat resistance, i.e. endurable to a high temperature process of 300° C. or more. Therefore, if the array substrate according to this invention which is provided with a aforementioned light-shielding component as a light-shielding film, as well as a liquid crystal display device provided with such an array substrate are employed, it is possible to achieve a low power consumption due to the high electric resistance of the light-shielding film. Moreover, it is possible according to the array substrate of this invention to form a light-shielding film which is functioning also as a black matrix, so that it is possible to ensure a high opening ratio.

This invention will be further explained with reference to the following examples and comparative examples.

EXAMPLE I

Example I-1

5 g of Eslec BLS (polyvinyl butyral resin, Sekisui Kagaku Co.) was added as a dispersant to 70 g of isopropyl alcohol to obtain an isopropyl alcohol solution, into which 25 g of Pigment Black 26 (a Fe—Cu—Mn composite oxide) was added as a black inorganic pigment. The average particle diameter of the black pigment employed in this case was 0.5 $\mu$m.

This isopropyl alcohol solution was then subjected to a dispersion treatment by making use of an SG mill provided therein with 0.5 mm alumina beads, thereby to obtain a pigment dispersion solution of a coloring composition of Example (I-1).

The coloring composition thus obtained was coated on the surface of a glass substrate and pre-baked at a temperature of 120° C. for 10 minutes to obtain a film having a pencil hardness of HB. When this film was further heated at a temperature of 600° C. for 30 minutes, the pencil hardness of the film was increased up to 2H. The film thus obtained was deep in black hue and excellent in color purity.

Moreover, the storage stability of this coloring composition was very excellent, and the dispersion condition of the pigment was maintained over several months.

Examples I-2 and I-3

The coloring compositions of Examples I-2 and I-3 were respectively prepared in the same manner as explained in Example I-1 except that Bick 104S (unsaturated higher carboxylic acid, Bickchemy Japan Co.) and Hitech 532 (polyacrylic resin, Nihon Julak Co.) were substituted for the dispersant of Example I-1.

The coloring compositions thus obtained were respectively coated on the surface of a glass substrate and pre-baked at a temperature of 120° C. for 10 minutes to obtain films, each having a pencil hardness of HB. When these films were further heated at a temperature of 600° C. for 30 minutes, the pencil hardness of the films were increased up to 2H, respectively. The films thus obtained were deep in black hue and excellent in color purity.

Moreover, the storage stability of these coloring compositions was very excellent, and the dispersion condition of these pigments was maintained over several months.

Examples I-4 to I-6

The coloring compositions of Examples I-4 to I-6 were respectively prepared in the same manner as explained in Example I-1 to I-3 except that Pigment Black 25 (an Fe—Cu—Cr composite oxide) was substituted for the black inorganic pigment of Example I-1 to I-3. The average particle diameter of the black pigment employed in this case was 0.3 $\mu$m.

The coloring compositions thus obtained were coated on the surface of a glass substrate and pre-baked at a temperature of 120° C. for 10 minutes to obtain films, each having a pencil hardness of HB. When these films were further heated at a temperature of 600° C. for 30 minutes, the pencil hardness of the films were increased up to 2H. The films thus obtained were deep in black hue and excellent in color purity.

Moreover, the storage stability of these coloring compositions was very excellent, and the dispersion condition of the pigment was maintained over several months.

Example I-7

10.0 g of M silicate 51 (Tama Kagaku Co.) and 5.0 g of methyltriethoxysilane, as metal alkoxide components, were dissolved in a mixed solvent comprising 15 g of isopropyl alcohol(IPA) and 5.0 g of n-butanol, and then 5.0 g of water was further added thereto to obtain a mixed solution. After being sufficiently stirred, the mixed solution was further added with 0.06 g of concentrated nitric acid and the resultant solution was heated at a temperature of 60° C. for one hour, after which the mixed solution was quenched down to room temperature. Then, 5.0 g of IPA and 15.0 g of n-butanol were added to the mixed solution to obtain a sol solution. Thereafter, 5.0 g of this sol solution and 10.0 g of the coloring composition or the pigment dispersion solution which was obtained in Example (I-1) were mixed together, thereby obtaining a coloring composition containing a metal oxide sol.

The coloring composition thus obtained was coated on the surface of a glass substrate by making use of a spinner and pre-baked at a temperature of 120° C. for 10 minutes to obtain a film having a pencil hardness of 7H. When this film was further heated at a temperature of 600° C. for 30 minutes, the pencil hardness of the film was increased up to 9H or more.

Moreover, the storage stability of this coloring compositions was very excellent, and the viscosity of the coloring composition was not substantially changed over two weeks, i.e. the dispersion condition of the pigment was maintained during the period.

Examples I-8 to I-12

The coloring compositions, each containing a metal oxide sol, of Examples I-8 to I-12 were respectively prepared in the same manner as explained in Example I-7 except that the coloring compositions of Examples I-2 to I-6 were substituted for the coloring composition of Example I-7 for forming a mixture with a sol solution.

These coloring compositions thus obtained were coated on the surface of a glass substrate by making use of a spinner and pre-baked at a temperature of 120° C. for 10 minutes to obtain black films, each having a pencil hardness of 7H. When the films were further heated at a temperature of 600° C. for 30 minutes, the pencil hardness of the films was increased up to 9H or more.

Moreover, the storage stability of these coloring compositions was very excellent, and the viscosity of these coloring compositions was not substantially changed over two weeks, i.e. the dispersion condition of the pigments was maintained during the period.

Example I-13

The coloring composition of Example I-13 was prepared by adding as a leveling agent 2g of a 10 wt % alcohol solution of Florard FC-430 (3M Co.) to the coloring composition of Example I-7.

The coloring composition thus obtained was coated on the surface of a glass substrate by making use of a spinner and pre-baked at a temperature of 120° C. for 10 minutes to obtain a film having a pencil hardness of 7H. When this film was further heated at a temperature of 600° C. for 30 minutes, the pencil hardness of the film was increased up to 9H or more.

Moreover, the storage stability of this coloring compositions was very excellent, and the viscosity of the coloring composition was not substantially changed over two weeks, i.e. the dispersion condition of the pigment was maintained during the period.

Example I-14

The coloring composition of Example I-14 was prepared by adding as a leveling agent 2 g of a 10 wt % alcohol solution of Silicone Oil KF-905 (Shinetsu Kagaku Co.) to the coloring composition of Example I-7.

The coloring composition thus obtained was coated on the surface of a glass substrate by making use of a spinner and pre-baked at a temperature of 120° C. for 10 minutes to obtain a film having a pencil hardness of 7H. When this film was further heated at a temperature of 600° C. for 30 minutes, the pencil hardness of the film was increased up to 9H or more.

Moreover, the storage stability of this coloring compositions was very excellent, and the viscosity of the coloring composition was not substantially changed over two weeks, i.e. the dispersion condition of the pigment was maintained during the period.

Example I-15

5.0 g of aluminum isopropoxide was dissolved as a metal alkoxide in a mixed solvent comprising 5.0 g of acetyl acetone and 15 g of IPA, and then 5.0 g of water was further added thereto to obtain a mixed solution. After being sufficiently stirred, the mixed solution was further added with 0.06 g of concentrated nitric acid and the resultant solution was heated at a temperature of 60° C. for one hour, after which the mixed solution was quenched down to room temperature. Then, 15.0 g of IPA and 5.0 g of n-butanol were added to the mixed solution to obtain a sol solution. Thereafter, 25.0 g of this sol solution and 20.0 g of the coloring composition or the pigment dispersion solution which was obtained in Example (I-1) were mixed together, thereby obtaining a coloring composition containing a metal oxide sol.

The coloring composition thus obtained was coated on the surface of a glass substrate by making use of a spinner and pre-baked at a temperature of 120° C. for 10 minutes to obtain a film having a pencil hardness of 7H. When this film was further heated at a temperature of 600° C. for 30 minutes, the pencil hardness of the film was increased up to 9H or more.

Moreover, the storage stability of this coloring compositions was very excellent, and the viscosity of the coloring composition was not substantially changed over two weeks, i.e. the dispersion condition of the pigment was maintained during the period.

Example I-16

The coloring composition was prepared in the same manner as explained in Example I-1 except that cupric oxide having an average particle diameter of 0.3 μm was substituted for the black inorganic pigment of Example I-1.

The coloring composition thus obtained was coated on the surface of a glass substrate and pre-baked at a temperature of 120° C. for 10 minutes to obtain a film having a pencil hardness of HB. When the film was further heated at a temperature of 600° C. for 30 minutes, the pencil hardness of the film was increased up to 2H. The film thus obtained was deep in black hue and excellent in color purity.

Moreover, the storage stability of the coloring composition was very excellent, and the dispersion condition of the pigment was maintained over several months.

Example I-17

A coloring composition containing a metal oxide sol was prepared in the same manner as explained in Example I-7 except that the coloring composition of Example I-16 was substituted for the coloring composition of Example I-7 for forming a mixture with a sol solution.

The coloring composition thus obtained was coated on the surface of a glass substrate by making use of a spinner and pre-baked at a temperature of 120° C. for 10 minutes to obtain black film having a pencil hardness of 7H. When the film was further heated at a temperature of 600° C. for 30 minutes, the pencil hardness of the film was increased up to 9H or more.

Moreover, the storage stability of the coloring composition was very excellent, and the viscosity of the coloring composition was not substantially changed over two weeks, i.e. the dispersion condition of the pigments was maintained during the period.

Example I-18

The coloring composition was prepared by adding as a leveling agent 2g of a 10 wt % alcohol solution of Florard FC-430 (3M Co.) to the coloring composition of Example I-17.

The coloring composition thus obtained was coated on the surface of a glass substrate by making use of a spinner and pre-baked at a temperature of 120° C. for 10 minutes to obtain a film having a pencil hardness of 7H. When this film was further heated at a temperature of 600° C. for 30 minutes, the pencil hardness of the film was increased up to 9H or more.

Moreover, the storage stability of this coloring compositions was very excellent, and the viscosity of the coloring composition was not substantially changed over two weeks, i.e. the dispersion condition of the pigment was maintained during the period.

Example I-19

15.0 g of M silicate 51 (Tama Kagaku Co.) was dissolved as a metal alkoxide in a mixed solvent comprising 15.0 g of ethyl Cellosolve and 5.0 g of n-butanol, and then 5.0 g of water was further added thereto to obtain a mixed solution. After being sufficiently stirred, the mixed solution was further added with 0.06 g of concentrated nitric acid and the resultant solution was heated at a temperature of 60° C. for one hour, after which the mixed solution was quenched down to room temperature. Then, 5.0 g of ethyl Cellosolve and 5.0 g of n-butanol were further added to the mixed solution to obtain a sol solution.

On the other hand, 15 g of Pigment Black 26 (an Fe—Cu—Mn composite oxide, 0.5 $\mu$m in average particle diameter) as a black inorganic pigment was dispersed into isopropyl alcohol by making use of 1.5 g of Eslec BLS (polyvinyl butyral resin, Sekisui Kagaku Co.) as a dispersant, thereby to prepare a pigment dispersion solution. The concentration of solid matter in this dispersion solution was 15 wt %.

Then, 30.0 g of the aforementioned Sol solution, 100 g of the pigment dispersion solution and 7.97 g of a 10 wt % butyl Cellosolve acetate solution of FC-430 (3M Co.) as a leveling agent were mixed together to obtain a black coloring composition containing a metal oxide sol.

This black coloring composition was spin-coated on the surface of a transparent glass substrate (#7059, Nihon Corning Co., 1.1 mm in thickness) to a thickness of 0.6 $\mu$m, thereby forming a black light-shielding film all over the entire surface. Then, a positive type photoresist OFPR-800 (Tokyo Ohka Co.) was coated on this black light-shielding film and on the back surface of the transparent glass substrate, whereby forming a resist film having a thickness of 1.0 $\mu$m.

Subsequently, the resist film coated on the black light-shielding film was selectively exposed, via an exposure photomask having a predetermined pattern, to the light from an ultra-high pressure mercury lamp. Then, the resist film was subjected to a paddle development using a positive type resist-developing liquid NMD-3 (Tokyo Ohka Co.), and water-sprayed to obtain a patterned resist film. The resultant substrate was dipped in a 4.7 wt % aqueous solution of HF for 60 to 120 seconds at room temperature, thereby allowing the black light-shielding film to be etched with the patterned resist being used as a mask. Thereafter, the substrate was sprayed with pure water (about 2 to 10 kg/cm$^2$) and then water-washed in a stream of water accompanying an ultrasonic vibration. Subsequently, the substrate was dried to obtain a patterned black light-shielding film.

Then, the resist remaining on both sides of the substrate was removed with a resist-releasing agent; 106 (Tokyo Ohka Co.) and, after being water-washed, dried using an air blower. It should be noted that it is also possible to completely and uniformly remove the resist by employing an oxygen plasma ashing method.

Thereafter, the substrate was heated for one hour in air atmosphere at a temperature of 330° C. by making use of an electric furnace, and then cooled down to room temperature. After being washed with water, the substrate was dried to obtain a black matrix having predetermined pattern. The black matrix thus obtained was 0.5 $\mu$m in thickness, low in reflectance and excellent in optical density, i.e. 3 in optical density.

Subsequently, procedures of exposure and development were repeated using pigment dispersion resists (blue, red and green) available on the market on the substrate provided with the black matrix prepared as mentioned above, thereby manufacturing a color filter. The resultant color filter was found excellent in contrast and in quality of picture image.

Comparative Example I-1

5 g of Eslec BLS (polyvinyl butyral resin, Sekisui Kagaku Co.) was added as a dispersant to 80 g of isopropyl alcohol to obtain an isopropyl alcohol solution, into which 5 g of carbon black was added as a black inorganic pigment.

This isopropyl alcohol solution was then subjected to a dispersion treatment by making use of an SG mill provided therein with 0.5 mm alumina beads, thereby to obtain a pigment dispersion solution or a coloring composition.

The coloring composition thus obtained was coated on the surface of a glass substrate and pre-baked at a temperature of 120° C. for 10 minutes to obtain a film having a pencil hardness of B. When this film was further heated at a temperature of 600° C. for 30 minutes, all of the film was burned out. Moreover, the film obtained was light in black hue and exhibited a dark brown color.

In the aforementioned examples, the formation of a light-shielding film with the black coloring composition of this invention was performed by coating the black coloring composition on the surface of a glass substrate by means of a spin coating method for instance. However, the employment of the black coloring composition of this invention is not limited to such a case where a uniform coating is desired, but is also applicable to the formation of letter or picture on a substrate as in the case a printed matter.

As illustrated in the above examples, it is possible to provide a black coloring composition which is excellent in staining power and adhesion, and can be stably preserved for a long period of time. Therefore, it is possible with this coloring composition to manufacture a black film which is excellent in color purity and can be applicable in various fields.

EXAMPLE II

Example II-1

15.0 g of M silicate 51 (Tama Kagaku Co.) as a siloxane oligomer that can be derived from a silane compound having a hydrolytic group was dissolved in a mixed solvent comprising 15.0 g of ethyl Cellosolve and 5.0 g of n-butanol, and then 5.0 g of water was further added thereto to obtain a mixed solution. After being sufficiently stirred, the mixed solution was further added with 0.06 g of concentrated nitric acid and the resultant solution was heated at a temperature of 60° C. for one hour, after which the mixed solution was quenched down to room temperature. Then, 5.0 g of ethyl Cellosolve and 15.0 g of n-butanol were added to the mixed solution to obtain a solution of silicon-based high molecular compound.

On the other hand, an Fe—Cu—Mn composite oxide, 0.5 $\mu$m in average particle diameter was dispersed as a color component into isopropyl alcohol, thereby to prepare a color component dispersion solution containing 15 wt % of solid matter.

Then, 30.0 g of the aforementioned silicon-based high molecular compound solution, 10 g of the color component dispersion solution and 7.97 g of a 10 wt % butyl Cellosolve acetate solution of FC-430 (3M Co.) as a leveling agent were mixed together to obtain a black coloring composition containing the silicon-based high molecular compound and the color component. Then, this black coloring composition was employed to manufacture a light-shielding substrate provide with a patterned black light-shielding film as illustrated below.

FIGS. 3A to 3F represent cross-sectional views each illustrating one example of process of manufacturing the light-shielding film.

Figure 3A:
FIGS. 3A to 3F are cross-sectional views each illustrating one example of process of manufacturing a light-shielding film according to this invention.
Figure 3B:
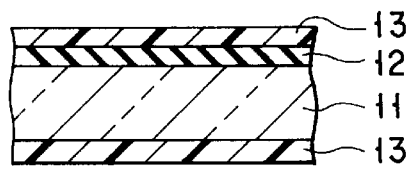

First of all, as shown in FIG. 3A, the black coloring composition was spin-coated on the surface of a transparent glass substrate 11 (#7059, Nihon Corning Co., 1.1 mm in thickness) to a thickness of 0.6 µm, thereby forming a film 12 all over the entire surface. Then, as shown in FIG. 3B, a positive type photoresist OFPR-800 (Tokyo Ohka Co.) was coated on this film 12 and on the back surface of the transparent glass substrate 11, whereby forming a resist film 13 having a thickness of 1.0 µm.

Figure 3C:
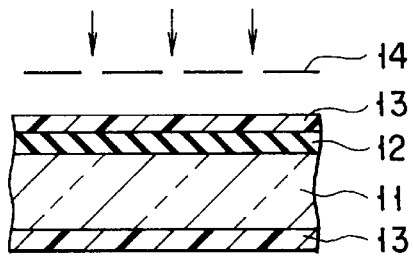
Figure 3D:
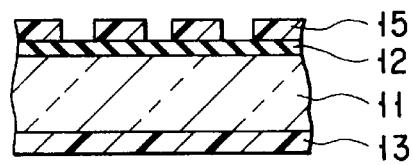
Figure 3E:
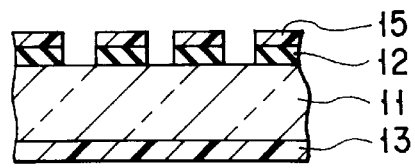
Figure 3F:
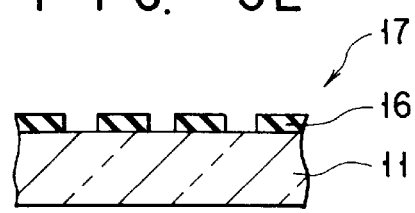

Subsequently, as shown in FIG. 3C, the resist film 13 coated on the film 12 was selectively exposed, via an exposure photomask 14 having a predetermined pattern, to the light from an ultra-high pressure mercury lamp. Then, the resist film 13 was subjected to a paddle development using a positive type resist-developing liquid NMD-3 (Tokyo Ohka Co.), and water-sprayed to obtain a patterned resist 15 as shown in FIG. 3D. The resultant substrate was dipped in a 4.7 wt % aqueous solution of HF for 60 to 120 seconds at room temperature, thereby allowing the film 12 to be etched with the patterned resist 15 being used as a mask. Thereafter, the substrate was sprayed with pure water (about 2 to 10 kg/cm$^2$) and then water-washed in a stream of water accompanying an ultrasonic vibration. Subsequently, the substrate was dried to obtain a patterned film as shown in FIG. 3E.

Then, the resist remaining on both sides of the substrate was removed with a resist-releasing agent; 106 (Tokyo Ohka Co.) and, after being water-washed, dried using an air blower. It should be noted that it is also possible to completely and uniformly remove the resist by employing an oxygen plasma ashing method.

Thereafter, the substrate was heated for one hour in air atmosphere at a temperature of 330° C. by making use of an electric furnace, and then cooled down to room temperature. After being washed with water, the substrate was dried to obtain a light-shielding substrate 17 having a black light-shielding film 16. The black light-shielding film 16 of light-shielding substrate 17 obtained in this manner was 0.55 µm in film thickness, 1.2 in optical density, and $10^9$ Ω·cm in volume resistivity. When the section of the black light-shielding film 16 was observed by means of TEM, the average particle diameter of the metal oxide constituting the color component was found kept remained as it was when the color component dispersion solution was prepared.

Example II-2

A light-shielding substrate was prepared in the same manner as explained in Example II-1 except that a transparent glass substrate 11 (#7913, Nihon Corning Co., 1.1 mm in thickness) was substituted for the transparent glass substrate of Example II-1, and the heating in the electric furnace was performed at a temperature of 600° C. for one hour. The black light-shielding film of the light-shielding substrate thus obtained was found to have a film thickness of 0.50 µm, an optical density of 1.3, and a volume resistivity of $10^9$ Ω·cm. Further, when the section of the black light-shielding film 16 was observed by means of TEM, the average particle diameter of the metal oxide constituting the color component was found kept remained as it was when the color component dispersion solution was prepared.

Example II-3

Another example of the manufacturing method of a light-shielding substrate will be explained with reference to FIGS. 4A to 4F.

Figure 4A:
FIGS. 4A to 4F are cross-sectional views each illustrating another example of process of manufacturing a light-shielding film according to this invention.

First of all, as shown in FIG. 4A, a water-soluble photoresist (PAD+an azide photosensitive liquid) was spin-coated on the surface of a transparent glass substrate 11 (#7059, Nihon Corning Co., 1.1 mm in thickness) to a thickness of 1.0 µm, thereby forming a transparent negative type photoresist film 19.

Figure 4B:
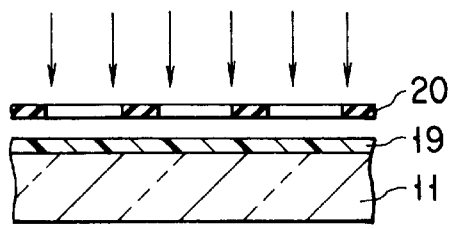
Figure 4C:
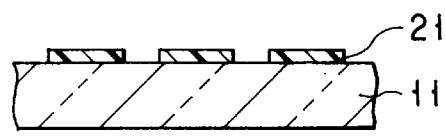

Then, as shown in FIG. 4B, the negative type photoresist film 19 was selectively exposed, via an exposure photomask 20 having a predetermined pattern, to the light from an ultra-high pressure mercury lamp. Then, the negative type photoresist film 19 was subjected to a development using a hot water spray conditioned to a temperature of 40° C. and a pressure of 1.5 kg/cm$^2$ to obtain a transparent negative type photoresist pattern 21 as shown in FIG. 4C.

Figure 4D:
Figure 4E:
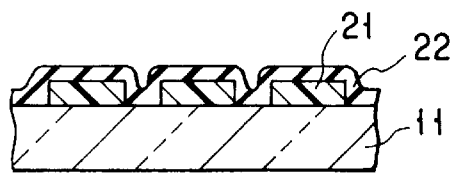

Then, as shown in FIG. 4D, the same black coloring composition as that of Example (II-1) was spin-coated on the surface of a transparent glass substrate as well as on the transparent negative type photoresist pattern 21 to a thickness of 0.6 µm, thereby forming a film 22 all over the substrate. Thereafter, the substrate was dipped in an etching solution ($H_2O_2$+a sulfamic acid mixed solution) having a predetermined concentration for 60 to 80 seconds at a temperature of 60° C., thereby allowing the transparent negative type photoresist pattern 21 to swell and at the same time deteriorating the adhesion strength between the resist pattern 21 and the glass substrate 11 as shown in FIG. 4E.

Thereafter, the transparent negative type photoresist pattern 21 and the portion of the film 22 which was coated on the pattern 21 were concurrently removed by means of a high pressure spray of about 3.5 kg/cm$^2$, and then water-washed. Subsequently, the substrate was dried using an air blower. It should be noted that it is also possible to completely and uniformly remove the resist by employing an oxygen plasma ashing method.

Figure 4F:
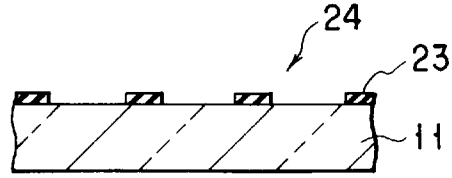

Finally, the substrate was heated for one hour in air atmosphere at a temperature of 330° C. by making use of an electric furnace, and then cooled down to room temperature. After being washed with water, the substrate was dried to obtain a light-shielding substrate 24 bearing a black light-shielding film 23 as shown in FIG. 4F. The black light-shielding film 23 of light-shielding substrate 24 obtained in this manner was 0.55 µm in film thickness, 1.2 in optical density, and $10^9$ Ω·cm in volume resistivity. When the section of the black light-shielding film 23 was observed by means of TEM, the average particle diameter of the metal oxide constituting the color component was found kept remained as it was when the color component dispersion solution was prepared.

Example II-4

Another example of the manufacturing method of a light-shielding substrate will be explained with reference to FIGS. 5A to 5F.

Figure 5A:
FIGS. 5A to 5F are cross-sectional views each illustrating another example of process of manufacturing a light-shielding film according to this invention.

First of all, as shown in FIG. 5A, a positive type photoresist OFPR-800 (Tokyo Ohka Co.) was coated on the surface of a transparent glass substrate 11 (#7059, Nihon Corning Co., 1.1 mm in thickness) to a thickness of 1.0 μm, thereby forming a resist film 26.

Figure 5B:
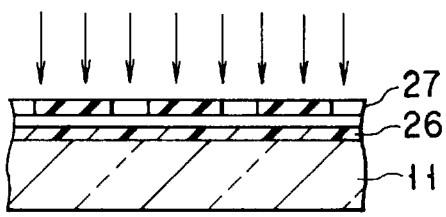
Figure 5C:
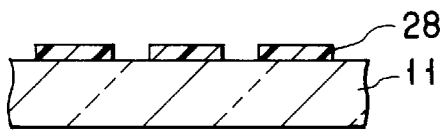

Then, as shown in FIG. 5B, this positive type photoresist film 26 was selectively exposed, via an exposure photomask 27 having a predetermined pattern, to a light (405 nm) of about 80 mJ/cm$^2$ in intensity by making use of an ultra-high pressure mercury lamp. Then, the positive type photoresist film 26 was subjected to a paddle development using a positive type resist-developing liquid NMD-3 (Tokyo Ohka Co.), and water-sprayed to obtain a positive type resist pattern 28 as shown in FIG. 5C.

Figure 5D:
Figure 5E:

Then, as shown in FIG. 5D, the same black coloring composition as that of Example (II-1) was spin-coated on the surface of a transparent glass substrate as well as on the transparent positive type photoresist pattern 28 to a thickness of 0.6 μm, thereby forming a film 29 all over the substrate. Then, the transparent positive type photoresist pattern 28 was entirely exposed from the back surface of the glass substrate 11 to a light (405nm) of about 200 mJ/cm$^2$ or more in intensity as shown in FIG. 5E.

Thereafter, the substrate was dipped in a positive type resist-developing liquid NMD-3 (Tokyo Ohka Co.) for about 30 seconds thereby to perform a paddle development and allowing the transparent positive type photoresist pattern 28 to be sufficiently swollen and dissolved.

Thereafter, the transparent positive type photoresist pattern 28 and the portion of the film 29 which was coated on the pattern 28 were concurrently removed by means of a high pressure spray of about 3.5 kg/cm$^2$, and then water-washed. Subsequently, the substrate was dried using an air blower. It should be noted that it is also possible to completely and uniformly remove the resist by employing an oxygen plasma ashing method.

Figure 5F:
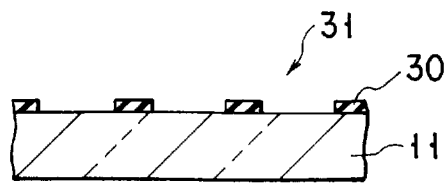

Finally, the substrate was heated for one hour in air atmosphere at a temperature of 330° C. by making use of an electric furnace, and then cooled down to room temperature. After being washed with water, the substrate was dried to obtain a light-shielding substrate 31 bearing a black light-shielding film 30 as shown in FIG. 5F.

The black light-shielding film 30 of light-shielding substrate 31 obtained in this manner was 0.55 μm in film thickness, 1.2 in optical density, and 10$^9$ Ω·cm in volume resistivity. When the section of the black light-shielding film 30 was observed by means of TEM, the average particle diameter of the metal oxide constituting the color component was found kept remained as it was when the color component dispersion solution was prepared.

Example II-5

A light-shielding substrate was prepared in the same manner as explained in Example II-3 except that a transparent glass substrate 11 (#7913, Nihon Corning Co., 1.1 mm in thickness) was substituted for the transparent glass substrate of Example II-3, and the heating in the electric furnace was performed at a temperature of 600° C. for one hour. The black light-shielding film of the light-shielding substrate thus obtained was found to have a film thickness of 0.50 μm, an optical density of 1.3, and a volume resistivity of 10$^9$ Ω·cm. Further, when the section of the black light-shielding film 23 was observed by means of TEM, the average particle diameter of the metal oxide constituting the color component was found kept remained as it was when the color component dispersion solution was prepared.

Example II-6

A light-shielding substrate was prepared in the same manner as explained in Example II-4 except that a transparent glass substrate 11 (#7913, Nihon Corning Co., 1.1 mm in thickness) was substituted for the transparent glass substrate of Example II-4, and the heating in the electric furnace was performed at a temperature of 600° C. for one hour. The black light-shielding film of the light-shielding substrate thus obtained was found to have a film thickness of 0.50 μm, an optical density of 1.3, and a volume resistivity of 10$^9$ Ω·cm. Further, when the section of the black light-shielding film 30 was observed by means of TEM, the average particle diameter of the metal oxide constituting the color component was found kept remained as it was when the color component dispersion solution was prepared.

Example II-7

FIG. 6 illustrates a cross-sectional view of one example of an array substrate according to this invention.

This array substrate was manufactured as follows.

First of all, the light-shielding substrate prepared in Example (II-1) was washed and deposited with a protective film 33 (Si—O—N, etc.) about 500 nm in thickness by means of a plasma CVD method in order to prevent the diffusion of ions from the substrate. By the way, there is any particular restriction regarding the method of forming the protective film 33, and a coating method may be employed in this case. For example, SiON film or SiO$_2$ film may be formed by making use of polysilazane or inorganic SOG, respectively.

Then, an Mo—Ta alloy film was deposited on the surface of this protective film 33 to a thickness of 300 nm by means of sputtering. Thereafter, the Mo—Ta alloy film was patterned by means of a photolithography treatment to form a source electrode 34, a drain electrode 35a and a drain line 35b.

Subsequently, a euamorphous silicon (α-Si) 100 nm in film thickness and SiN$_x$ (not shown) 50 nm in film thickness were successively deposited on the substrate by means of plasma CVD method, and then etched by making use of a photolithography, thereby obtaining a euamorphous silicon layer 37 of island shape.

Furthermore, an SiN$_x$ layer 350 nm in thickness was deposited on this euamorphous silicon layer 37 by means of plasma CVD method, and then an Al layer 300 nm in thickness and a Mo layer 50 nm in thickness were successively deposited on the SiN$_x$ layer by means of sputtering. Thereafter, the Al/Mo layers were etched by making use of a photolithography, thereby obtaining a gate electrode 39a and a gate line 39b. Then, the SiN$_x$ layer was patterned by means of a selective dry etching method thereby to form a gate insulating film 40.

Then, an n$^+$-type semiconductor layer 38 was formed by way of ion doping method using a phosphine gas in order to form an ohmic contact at the contacting portions between the source electrode 34 and the euamorphous silicon layer 37, and between the drain electrode 35a and the euamorphous silicon layer 37. Thereafter, a passivation film (SiN$_x$) 41 having a thickness of 200 nm was formed over the gate electrode 39a and the gate line 39b by means of a plasma CVD method.

In order to form a contact between the source electrode 34 and the pixel electrode, a portion of the passivation film (SiN$_x$) 41 was patterned by means of photolithography. Finally, an ITO was formed by means of sputtering and then patterned by means of photolithography to form a transparent pixel electrode 42, thus obtaining an array substrate.

In the aforementioned manufacturing process of an array substrate, the light-shielding substrate was exposed to a reduced pressure condition at the occasion of the plasma CVD, any problem such as degassing was not raised. Further, the discoloration of the black light-shielding film 16 was not admitted at all even after the high temperature processing of about 300° C. at the occasion of forming the α-Si film.

Example II-8

FIG. 7 illustrates a cross-sectional view of another example of an array substrate according to this invention.

This array substrate was manufactured as follows.

First of all, the light-shielding substrate prepared in Example (II-1) was washed and deposited with a protective film 33 (Si—O—N, etc.) about 500 nm in thickness by means of a plasma CVD method in order to prevent the diffusion of ions from the substrate.

Then, an Mo—Ta alloy film was deposited on the surface of this protective film 33 to a thickness of 300 nm by means of sputtering. Thereafter, the Mo—Ta alloy film was patterned by means of a photolithography treatment to form a source electrode 34, a drain electrode 35a and a drain line 35b.

Subsequently, a euamorphous silicon (α-Si) 100 nm in film thickness and $SiN_x$ (not shown) 50 nm in film thickness were successively deposited on the substrate by means of plasma CVD method, and then etched by making use of a photolithography, thereby obtaining a euamorphous silicon layer 37 of island shape.

Furthermore, an $SiN_x$ layer 350 nm in thickness was deposited on this euamorphous silicon layer 37 by means of plasma CVD method, and then an Al layer 300 nm in thickness and a Mo layer 50 nm in thickness were successively deposited on the $SiN_x$ layer by means of sputtering. Thereafter, the Al/Mo layers were etched by making use of a photolithography, thereby obtaining a gate electrode 39a and a gate line 39b. Then, the $SiN_x$ layer was patterned by means of a selective dry etching method thereby to form a gate insulating film 40.

Then, an $n^+$-type semiconductor layer 38 was formed by way of ion doping method using a phosphine gas in order to form an ohmic contact at the contacting portions between the source electrode 34 and the euamorphous silicon layer 37, and between the drain electrode 35a and the euamorphous silicon layer 37.

Thereafter, a passivation film ($SiN_x$) 41 having a thickness of 200 nm was formed over the gate electrode 39a and the gate line 39b by means of a plasma CVD method. Subsequently, a resist (HRC-104, Nihon Gosei Gomu Co.) was spin-coated over the surface of substrate to form a resist film 2 μm in film thickness. In order to form a contact between the source electrode 34 and the pixel electrode, this resist film was then subjected to a sequence of exposure, development and selective etching thereby forming a contact hole in the passivation film ($SiN_x$) 41.

Subsequently, the resist film remaining on the passivation film ($SiN_x$) 41 was heated to a temperature of 160° C. so as to completely decompose the sensitizer and at the same time to crosslink the polymer, thus forming a colorless transparent insulating film 43. Finally, an ITO was formed by means of sputtering and then patterned by means of photolithography to form a transparent pixel electrode 42, thus obtaining an array substrate.

In the aforementioned manufacturing process of an array substrate, the light-shielding substrate was exposed to a reduced pressure condition at the occasion of the plasma CVD, any problem such as degassing was not raised. Further, the discoloration of the black light-shielding film 16 was not admitted at all even after the high temperature processing of about 300° C. at the occasion of forming the α-Si film.

Example II-9

FIG. 8 illustrates a cross-sectional view of another example of an array substrate according to this invention.

This array substrate was manufactured as follows.

First of all, the light-shielding substrate prepared in Example (II-2) was washed and deposited with a protective film 33 (Si—O—N, etc.) about 500 nm in thickness by means of a plasma CVD method in order to prevent the diffusion of ions from the substrate.

Then, a euamorphous silicon (α-Si) 100 nm in film thickness and $SiN_x$ (not shown) 50 nm in film thickness were successively deposited on the protective film 33 by means of plasma CVD method, and then etched by making use of a photolithography, thereby obtaining a euamorphous silicon layer of island shape. This euamorphous silicon layer was then annealed at a temperature of 600° C. in an electric furnace thereby crystallizing the euamorphous silicon layer to form a eupolycrystalline silicon layer 46.

Furthermore, an insulating film 47 350 nm in thickness which is formed of $SiN_x$ and functioning also as a gate insulating film was deposited on this eupolycrystalline silicon layer 46 by means of plasma CVD method, and then an Al layer 300 nm in thickness and a Mo layer 50 nm in thickness were successively deposited on the insulating film 47 by means of sputtering. Thereafter, the Al/Mo layers were etched by making use of a photolithography, thereby obtaining a gate electrode 48a and a gate line 48b.

Then, an insulating film ($SiO_x$) to be interposed between any one of the gate electrode 48a and gate line 48b and any one of the source electrode, drain electrode and drain lines was formed to a thickness of 200 nm by means of plasma CVD method. In order to form a contact between the source and drain electrodes and the eupolycrystalline silicon (p-Si) layer 46, contact holes were formed in these insulating films 47 and 49 by means of a selective etching method.

Then, an $n^+$-type semiconductor layer 50 was formed by way of ion doping method using a phosphine gas in order to form an ohmic contact at the contacting portions between the source electrode and the eupolycrystalline silicon layer 46, and between the drain electrode and the eupolycrystalline silicon layer 46.

Then, an Mo—Ta alloy film was deposited on the surface of this insulating film 49 to a thickness of 500 nm by means of sputtering. Thereafter, the Mo—Ta alloy film was patterned by means of a photolithography treatment to form a source electrode 51, a drain electrode 52a and a drain line 52b.

Then, a resist film was formed to cover the source electrode 51, the drain electrode 52a and the drain line 52b. After an ITO was formed all over the surface of the resist film by means of sputtering, the resist film was patterned by means of photolithography thereby to form a transparent pixel electrode 54.

Finally, an $SiN_x$ film having a thickness of 200 nm was formed by means of a plasma CVD method, and patterned by means of photolithography so as to expose the transparent pixel electrode 54 and to form a passivation film 53, thus obtaining an array substrate.

In the aforementioned manufacturing process of an array substrate, the light-shielding substrate was exposed to a reduced pressure condition at the occasion of the plasma CVD, any problem such as degassing was not raised. Further, the discoloration of the black light-shielding film 16 was not admitted at all even after the high temperature processing of about 300° C. at the occasion of forming the α-Si film or even after the annealing of the α-Si film at a temperature of 600° C.

Example II-10

Figure 9:
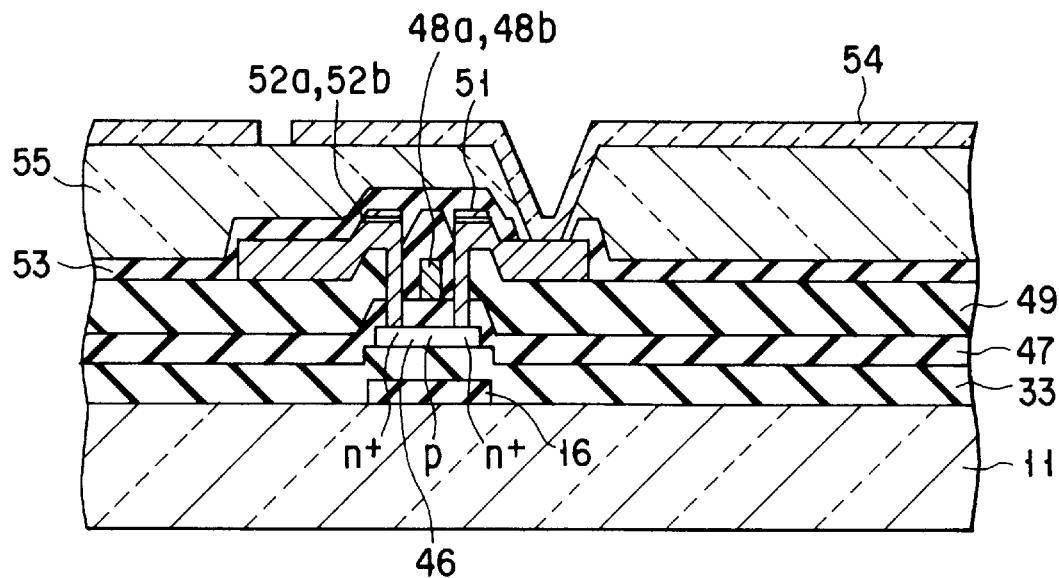
FIG. 9 is a cross-sectional view illustrating another example of an array substrate according to this invention.

FIG. 9 illustrates a cross-sectional view of another example of an array substrate according to this invention.

This array substrate was manufactured as follows.

First of all, the light-shielding substrate prepared in Example (II-5) was washed and deposited with a protective film 33 (Si—O—N, etc.) about 500 nm in thickness by means of a plasma CVD method in order to prevent the diffusion of ions from the substrate.

Then, a euamorphous silicon (α-Si) 100 nm in film thickness and $SiN_x$ (not shown) 50 nm in film thickness were successively deposited on the protective film 33 by means of plasma CVD method, and then etched by making use of a photolithography, thereby obtaining a euamorphous silicon layer of island shape. This euamorphous silicon layer was then annealed at a temperature of 600° C. in an electric furnace thereby crystallizing the euamorphous silicon layer to form a eupolycrystalline silicon layer 46.

Furthermore, an insulating film 47 350 nm in thickness which is formed of $SiN_x$ and functioning also as a gate insulating film was deposited on this eupolycrystalline silicon layer 46 by means of plasma CVD method, and then an Al layer 300 nm in thickness and a Mo layer 50 nm in thickness were successively deposited on the insulating film 47 by means of sputtering. Thereafter, the Al/Mo layers were etched by making use of a photolithography, thereby obtaining a gate electrode 48a and a gate line 48b.

Then, an insulating film ($SiO_x$) 49 to be interposed between any one of the gate electrode 48a and gate line 48b and any one of the source electrode, drain electrode and drain lines was formed to a thickness of 200 nm by means of plasma CVD method. In order to form a contact between the source and drain electrodes and the eupolycrystalline silicon (p-Si) layer 46, contact holes were formed in these insulating films 47 and 49 by means of a selective etching method.

Then, an $n^+$-type semiconductor layer 50 was formed by way of ion doping method using a phosphine gas in order to form an ohmic contact at the contacting portions between the source electrode and the eupolycrystalline silicon layer 46, and between the drain electrode and the eupolycrystalline silicon layer 46.

Then, an Mo—Ta alloy film was deposited on the surface of this insulating film 49 to a thickness of 500 nm by means of sputtering. Thereafter, the Mo—Ta alloy film was patterned by means of a photolithography treatment to form a source electrode 51, a drain electrode 52a and a drain line 52b.

Thereafter, a passivation film ($SiN_x$) 53 having a thickness of 200 nm was formed over the source electrode 51, drain electrode 52 and the drain line 52b by means of a plasma CVD method. Subsequently, a resist (HRC-104, Nihon Gosei Gomu Co.) was spin-coated over the surface of substrate to form a resist film 2 μm in film thickness. In order to form a contact between the source electrode 51 and the pixel electrode, this resist film was then subjected to a sequence of exposure, development and selective etching thereby forming a contact hole in the passivation film ($SiN_x$) 53.

Subsequently, the resist film remaining on the passivation film ($SiN_x$) 53 was heated to a temperature of 160° C. so as to completely decompose the sensitizer and at the same time to crosslink the polymer, thus forming a colorless transparent insulating film 55. Finally, an ITO was formed by means of sputtering and then patterned by means of photolithography to form a transparent pixel electrode 54, thus obtaining an array substrate.

In the aforementioned manufacturing process of an array substrate, the light-shielding substrate was exposed to a reduced pressure condition at the occasion of the plasma CVD, any problem such as degassing was not raised. Further, the discoloration of the black light-shielding film 23 was not admitted at all even after the high temperature processing of about 300° C. at the occasion of forming the α-Si film or even after the annealing of the α-Si film at a temperature of 600° C.

Example II-11

A solvent-soluble polyimide varnish was coated on the array substrate prepared in Example (II-7), and the resultant surface of the substrate was successively subjected to a heat treatment and a rubbing treatment to form a liquid crystal alignment film.

On the other hand, a color filter was formed on a transparent glass substrate in the conventional manner, and then ITO film was deposited on the color filter by way of sputtering thereby forming a counter electrode. Then, a solvent-soluble polyimide varnish was coated on the ITO film, and then subjected successively to a heat treatment and a rubbing treatment, thereby obtaining a color filter substrate provided with a liquid crystal alignment film.

Then, these color filter substrate and the array substrate were superimposed in such a manner that both of the liquid crystal alignment films of these substrates face to each other at a distance of 5 μm with a spacer being interposed therebetween. After the periphery of the superimposed body was sealed thereby to form a liquid crystal cell, 6CB (4,4'-hexylcyanobiphenyl) was charged as a liquid crystal into the liquid crystal cell, thereby forming a liquid crystal display device. When the voltage retention of the resultant liquid crystal display device was measured at room temperature, a value of 98% was obtained indicating an excellent voltage retention.

Examples II-12 to II-14

The liquid crystal display devices of Examples II-12 to II-14 were respectively prepared in the same manner as explained in Example II-11 except that the array substrates prepared in Examples II-8 to II-10 were substituted for the array substrate of Example II-11.

When the voltage retention of each of the resultant liquid crystal display devices was measured at room temperature, each of the resultant liquid crystal display devices exhibited a value of 98%, indicating an excellent voltage retention.

Figure 10:
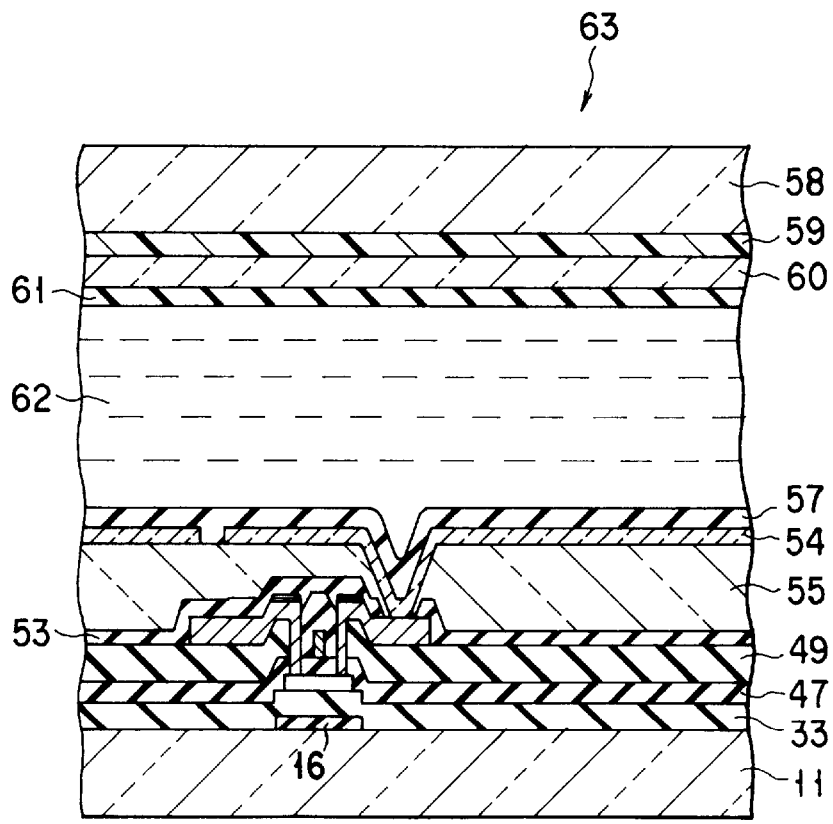
FIG. 10 is a cross-sectional view illustrating one example of a liquid crystal display device according to this invention.

FIG. 10 illustrates a cross-sectional view of one example of the liquid crystal display device of this invention.

In the liquid crystal display device shown in FIG. 10, the array substrate prepared in Example (II-10) was employed, and a liquid crystal alignment film 57 was formed on this substrate. The reference numeral 58 denotes a transparent glass substrate, on which a color filter 59, a counter electrode 60 and a liquid crystal alignment film 61 were successively superimposed.

A liquid crystal layer 62 was interposed between the array substrate bearing the liquid crystal alignment film 57 and the color filter substrate, thereby forming a liquid crystal display device.

Example II-15

10.0 g of M silicate 51 (Tama Kagaku Co.) as a siloxane oligomer that can be derived from a silane compound having a hydrolytic group and 5.0 g of methyltriethoxysilane which is a silane compound having hydrolytic group were dissolved in a mixed solvent comprising 15.0 g of ethyl Cellosolve and 5.0 g of n-butanol, and then 5.0 g of water was further added thereto to obtain a mixed solution. After being sufficiently stirred, the mixed solution was further added with 0.06 g of concentrated nitric acid and the resultant solution was heated at a temperature of 60° C. for one hour, after which the mixed solution was quenched down to room temperature. Then, 5.0 g of ethyl Cellosolve and 15.0 g of n-butanol were added to the mixed solution to obtain a solution of silicon-based high molecular compound.

On the other hand, an Fe—Cu—Mn composite oxide, 0.5 $\mu$m in average particle diameter was dispersed as a color component into isopropyl alcohol, thereby to prepare a color component dispersion solution containing 15 wt % of solid matter.

Then, 30.0 g of the aforementioned silicon-based high molecular compound solution, 100 g of the color component dispersion solution and 7.97 g of a 10 wt % butyl Cellosolve acetate solution of FC-430 (3M Co.) as a leveling agent were mixed together to obtain a black coloring composition containing the metal oxide sol and the color component. Then, the same procedures as those of Example (II-1) were followed by using this black coloring composition to manufacture a light-shielding substrate provide with a patterned black light-shielding film.

The black light-shielding film of light-shielding substrate obtained in this manner was 0.55 $\mu$m in film thickness, 1.2 in optical density, and $10^9$ $\Omega$·cm in volume resistivity. When the section of the black light-shielding film was observed by means of TEM, the average particle diameter of the metal oxide constituting the color component was found kept remained as it was when the color component dispersion solution was prepared.

Example II-16

2.5 g of triisopropoxy aluminum was dissolved as a metal alkoxide in a mixed solvent comprising 5.0 g of 2,4-pentadione, 10.0 g of ethyl Cellosolve and 5.0 g of n-butanol, and then 12.5 g of M silicate 51 (Tama Kagaku Co.) and 5.0 g of water were further added thereto to obtain a mixed solution. After being sufficiently stirred, the mixed solution was further added with 0.06 g of concentrated nitric acid and the resultant solution was heated at a temperature of 60° C. for one hour, after which the mixed solution was quenched down to room temperature. Then, 5.0 g of ethyl Cellosolve and 15.0 g of n-butanol were further added to the mixed solution to obtain a metal oxide sol solution.

On the other hand, an Fe—Cu—Mn composite oxide, (0.5 $\mu$m in average particle diameter) was dispersed as a black inorganic pigment into isopropyl alcohol, thereby to prepare a pigment dispersion solution. The concentration of solid matter in this dispersion solution was 15 wt %.

Then, 30.0 g of the aforementioned sol solution, 10 g of the pigment dispersion solution and 7.97 g of a 10 wt % butyl Cellosolve acetate solution of FC-430 (3M Co.) as a leveling agent were mixed together to obtain a black coloring composition containing a metal oxide sol. Then, the same procedures as those of Example (II-1) were followed by using this black coloring composition to manufacture a light-shielding substrate provide with a patterned black light-shielding film.

The black light-shielding film of light-shielding substrate obtained in this manner was 0.55 $\mu$m in film thickness, 1.2 in optical density, and $10^9$ $\Omega$·cm in volume resistivity. When the section of the black light-shielding film was observed by means of TEM, the average particle diameter of the metal oxide constituting the color component was found kept remained as it was when the color component dispersion solution was prepared.

Example II-17

5.0 g of triisopropoxy aluminum was dissolved as a metal alkoxide in a mixed solvent comprising 15.0 g of 2,4-pentadione and 5.0 g of n-butanol, and then 5.0 g of water was further added thereto to obtain a mixed solution. After being sufficiently stirred, the mixed solution was further added with 0.06 g of concentrated nitric acid and the resultant solution was heated at a temperature of 60° C. for one hour, after which the mixed solution was quenched down to room temperature. Then, 15.0 g of ethyl Cellosolve and 5.0 g of n-butanol were further added to the mixed solution to obtain a metal oxide sol solution.

On the other hand, an Fe—Cu—Mn composite oxide, (0.5 $\mu$m in average particle diameter) was dispersed as a color component into isopropyl alcohol, thereby to prepare a pigment dispersion solution. The concentration of solid matter in this dispersion solution was 15 wt %.

Then, 50.0 g of the aforementioned sol solution, 10 g of the pigment dispersion solution and 6.38 g of a 10 wt % butyl Cellosolve acetate solution of FC-430 (3M Co.) as a leveling agent were mixed together to obtain a black coloring composition containing a metal oxide sol. Then, the same procedures as those of Example (II-1) were followed by using this black coloring composition to manufacture a light-shielding substrate provide with a patterned black light-shielding film.

The black light-shielding film of light-shielding substrate obtained in this manner was 0.50 $\mu$m in film thickness, 1.0 in optical density, and $10^9$ $\Omega$·cm in volume resistivity. When the section of the black light-shielding film was observed by means of TEM, the average particle diameter of the metal oxide constituting the color component was found kept remained as it was when the color component dispersion solution was prepared.

Example II-18

A light-shielding substrate was prepared in the same manner as explained in Example II-16 except that a transparent glass substrate (#7913, Nihon Corning Co., 1.1 mm in thickness) was substituted for the transparent glass substrate of Example II-16, and the heating in the electric furnace was performed at a temperature of 600° C. for one hour. The black light-shielding film of the light-shielding substrate thus obtained was found to have a film thickness of 0.50 $\mu$m, an optical density of 1.3, and a volume resistivity of $10^9$ Ω·cm. Further, when the section of the black light-shielding film was observed by means of TEM, the average particle diameter of the metal oxide constituting the color component was found kept remained as it was when the color component dispersion solution was prepared.

Example II-19

A light-shielding substrate was prepared in the same manner as explained in Example II-17 except that a transparent glass substrate (#7913, Nihon Corning Co., 1.1 mm in thickness) was substituted for the transparent glass substrate of Example II-17, and the heating in the electric furnace was performed at a temperature of 600° C. for one hour. The black light-shielding film of the light-shielding substrate thus obtained was found to have a film thickness of 0.50 μm, an optical density of 1.1, and a volume resistivity of $10^9$ Ω·cm. Further, when the section of the black light-shielding film was observed by means of TEM, the average particle diameter of the metal oxide constituting the color component was found kept remained as it was when the color component dispersion solution was prepared.

Example II-20

15.0 g of M silicate 51 (Tama Kagaku Co.) as a siloxane oligomer that can be derived from a silane compound having a hydrolytic group was dissolved in a mixed solvent comprising 15.0 g of ethyl Cellosolve and 5.0 g of n-butanol, and then 5.0 g of water was further added thereto to obtain a mixed solution. After being sufficiently stirred, the mixed solution was further added with 0.06 g of concentrated nitric acid and the resultant solution was heated at a temperature of 60° C. for one hour, after which the mixed solution was quenched down to room temperature. Then, 5.0 g of ethyl Cellosolve and 15.0 g of n-butanol were added to the mixed solution to obtain a solution of silicon-based high molecular compound.

On the other hand, copper oxide (0.3 μm in average particle diameter) was dispersed as a color component into isopropyl alcohol, thereby to prepare a color component dispersion solution containing 15 wt % of solid matter.

Then, 30.0 g of the aforementioned silicon-based high molecular compound solution, 100 g of the color component dispersion solution and 7.97 g of a 10 wt % butyl Cellosolve acetate solution of FC-430 (3M Co.) as a leveling agent were mixed together to obtain a black coloring composition containing the silicon-based high molecular compund and the color component. Then, the same procedures as those of Example (II-1) were followed by using this black coloring composition to manufacture a light-shielding substrate provide with a patterned black light-shielding film.

The black light-shielding film of light-shielding substrate obtained in this manner was 0.55 μm in film thickness, 1.0 in optical density, and $10^9$ Ω·cm in volume resistivity. When the section of the black light-shielding film was observed by means of TEM, the average particle diameter of the metal oxide constituting the color component was found kept remained as it was when the color component dispersion solution was prepared.

Example II-21

A light-shielding substrate was prepared in the same manner as explained in Example II-20 except that a transparent glass substrate (#7913, Nihon Corning Co., 1.1 mm in thickness) was substituted for the transparent glass substrate of Example II-20, and the heating in the electric furnace was performed at a temperature of 600° C. for one hour. The black light-shielding film of the light-shielding substrate thus obtained was found to have a film thickness of 0.50 μm, an optical density of 1.1, and a volume resistivity of $10^9$ Ω·cm. Further, when the section of the black light-shielding film was observed by means of TEM, the average particle diameter of the metal oxide constituting the color component was found kept remained as it was when the color component dispersion solution was prepared.

Comparative Example II-1

A black matrix pigment dispersion resist (CK2000, Fuji Hant Co.) was coated on a glass substrate by making use of a spinner, and then prebaked for 10 minutes at a temperature of 120° C. to obtain a light-shielding film having a thickness of 0.6 μm. The light-shielding film thus obtained indicated a volume resistivity of as high as $10^{13}$ Ω·cm. However, when this light-shielding film was heated at a temperature of 600° C. for 30 minutes, the film was decomposed, indicating that this film was not applicable to a black matrix-on array substrate.

Comparative Example II-2

10.0 g of M silicate 51 (Tama Kagaku Co.) as a siloxane oligomer that can be derived from a silane compound having a hydrolytic group and 5.0 g of methyltriethoxysilane which is a silane compound having a hydrolytic group were dissolved in a mixed solvent comprising 15.0 g of isopropyl alcohol and 5.0 g of n-butanol, and then 5.0 g of water was further added thereto to obtain a mixed solution. After being sufficiently stirred, the mixed solution was further added with 0.06 g of concentrated nitric acid and the resultant solution was heated at a temperature of 60° C. for one hour, after which the mixed solution was quenched down to room temperature. Then, 5.0 g of IPA and 15.0 g of n-butanol were added to the mixed solution to obtain a solution of silicon-based high molecular compound.

Then, 10.0 g of this silicon-based high molecular compound solution and 10.0 g of an alcohol dispersion solution of carbon black (0.3 μm in average particle diameter, 25 wt % in concentration of carbon black, Fuji Shikiso Co.) were mixed together to obtain a black coloring composition.

The black coloring composition was coated on a glass substrate by making use of a spinner, and then prebaked for 10 minutes at a temperature of 120° C. to obtain a light-shielding film having a thickness of 0.6 μm. The light-shielding film thus obtained indicated a volume resistivity of as low as $10^5$ Ω·cm. When this light-shielding film was heated at a temperature of 600° C. in a nitrogen atmosphere for 30 minutes, the shape of the film having a thickness of 0.5 μm was maintained, but the volume resistivity of the resultant film was decreased down to 10 Ω·cm.

It can be understood from these results that if a color component consisting of a specific kind of metal oxide is included into a silicon matrix having a three-dimensional structure comprising a Si—O—Si bond, or into an inorganic oxide glass comprising at least one kind of oxide selected from aluminum oxide and silicon oxide, it is possible to provide a light-shielding film which is high in electric resistance and excellent in heat resistance.

EXAMPLE III

Synthesis Example III-1

Synthesis of poly(phenylsilylene ethynylene-1,3-phenylene ethynylene)

10.8 g of phenylsilane and 12.6 g of m-diethynylbenzene were dissolved in 10 ml of dried toluene in an argon atmosphere, and then mixed with 25 g of dried magnesium oxide in a flask. Then, the resultant mixture was allowed to react for one hour at room temperature and for five hours at a temperature of 80° C. Then, toluene was added to this reaction mixture and the catalyst was filtered off. Subsequently, the filtrate was concentrated and washed with hexane so as to remove unreacted monomer. The product thus obtained was dried under a reduced pressure to obtain 12.5 g of an organic silicon-based high molecular compound to be incorporated into the black coloring composition of this example, i.e. poly(phenylsilylene ethynylene-1,3-phenylene ethynylene). The weight average molecular weight of the high molecular compound was 3,400.

Synthesis Example III-2

Synthesis of poly(diphenylsilylene ethynylene-1,3-phenylene ethynylene)

18.4 g of biphenylsilane and 12.6 g of m-diethynylbenzene were dissolved in 10 ml of dried toluene in an argon atmosphere, and then mixed with 25 g of dried magnesium oxide in a flask. Then, the resultant mixture was allowed to react for one hour at room temperature and for five hours at a temperature of 80° c. Then, toluene was added to this reaction mixture and the catalyst was filtered off. Subsequently, the filtrate was concentrated and washed with hexane so as to remove unreacted monomer. The product thus obtained was dried under a reduced pressure to obtain 16.5 g of an organic silicon-based high molecular compound to be incorporated into the black coloring composition of this example, i.e. poly (diphenylsilylene ethynylene1,3-phenylene ethynylene). The weight average molecular weight of the high molecular compound was 1,400.

Example III-1

3.0 g of Ajisper (PN411, Ajinomoto Co.) was dissolved as a dispersant in 82.0 g of toluene to form a solution, into which 15.0 g of Pigment Black (Fe—Cu—Mn composite oxide) was added as a black inorganic pigment and stirred. The average particle diameter of the pigment employed in this example was 0.5 $\mu$m.

Then, this solution was allowed to disperse by making use of a dispersion apparatus (nanomizer), thereby preparing a pigment dispersion solution.

On the other hand, 20.0 g of poly(phenylsilylene ethynylene-1,3-phenylene ethynylene) was dissolved into 80.0 g of toluene to obtain a solution of silicon-based high molecular compound. Then, 10 g of this solution of silicon-based high molecular compound and 10.0 g of the aforementioned pigment dispersion solution were mixed together to obtain a coloring composition of Example The coloring composition thus obtained was coated on the surface of a glass substrate and pre-baked at a temperature of 120° C. for 10 minutes to obtain a film having a pencil hardness of HB. When this film was further heated at a temperature of 400° C. for 30 minutes, the pencil hardness of the film was increased up to 9H. The film thus obtained was deep in black hue and excellent in color purity.

Moreover, the storage stability of this coloring composition was very excellent, and the dispersion condition of the pigment was maintained over several months.

Examples III-2 and III-3

The coloring compositions of Examples III-2 and III-3 were respectively prepared in the same manner as explained in Example III-1 except that Pigment Black 27 (Fe—Cu—Cr composite oxide, 0.5 $\mu$m in average particle diameter) and Pigment Black 28 (Fe—Cr composite oxide, 0.5 $\mu$m in average particle diameter) were substituted for the coloring composition of Example III-1.

The coloring compositions thus obtained were respectively coated on the surface of a glass substrate and pre-baked at a temperature of 120° C. for 10 minutes to obtain films, each having a pencil hardness of HB. When these films were further heated at a temperature of 400° C. for 30 minutes, the pencil hardness of the films were increased up to 9H, respectively. The films thus obtained were deep in black hue and excellent in color purity.

Moreover, the storage stability of these coloring compositions was very excellent, and the dispersion condition of these pigments was maintained over several months.

Examples III-4 to III-6

The coloring compositions of Examples III-4, III-5 and III-6 were respectively prepared in the same manner as explained in Examples III-1, III-2 and III-3 except that Bick 104S (unsaturated higher carboxylic acid, Bickchemy Japan Co.) was substituted for the dispersants of Examples III-1, III-2 and III-3.

The coloring compositions thus obtained were respectively coated on the surface of a glass substrate and pre-baked at a temperature of 120° C. for 10 minutes to obtain films, each having a pencil hardness of HB. When these films were further heated at a temperature of 400° C. for 30 minutes, the pencil hardness of the films were increased up to 9H, respectively. The films thus obtained were deep in black hue and excellent in color purity.

Moreover, the storage stability of these coloring compositions was very excellent, and the dispersion condition of these pigments was maintained over several months.

Example III-7

The coloring composition of Example III-7 was prepared in the same manner as explained in Example III-1 except that poly(diphenylsilylene ethynylene-1,3-phenylene ethynylene) was substituted for poly(phenylsilylene ethynylene-1,3-phenylene ethynylene) of Examples III-1.

The coloring composition thus obtained was coated on the surface of a glass substrate and pre-baked at a temperature of 120° C. for 10 minutes to obtain film having a pencil hardness of HB. When the film was further heated at a temperature of 400° C. for 30 minutes, the pencil hardness of the film was increased up to 9H. The film thus obtained was deep in black hue and excellent in color purity.

Moreover, the storage stability of the coloring composition was very excellent, and the dispersion condition of the pigment was maintained over several months.

Example III-8

10.0 g of the aforementioned poly(phenylsilylene ethynylene-1,3-phenylene ethynylene) was dissolved in 90 g of toluene to obtain a solution of silicon-based high molecular compound.

On the other hand, an Fe—Cu—Mn composite oxide, (0.5 $\mu$m in average particle diameter) was dispersed as a color component into isopropyl alcohol, thereby to prepare a pigment dispersion solution containing 15 wt % of solid matter.

Then, 10.0 g of this solution of silicon-based high molecular compound, 10 g of the pigment dispersion solution and 0.80 g of a 10 wt % butyl Cellosolve acetate solution of FC-430 (3M Co.) as a leveling agent were mixed together to obtain a black coloring composition containing a silicon-based polymer and a coloring component. Then, the same procedures as those of Example (II-3) were followed by using this black coloring composition to manufacture a light-shielding substrate provide with a patterned black light-shielding film.

First of all, as shown in FIG. 4A, a water-soluble photoresist (PAD+an azide photosensitive liquid) was spin-coated on the surface of a transparent glass substrate 11 (#7059, Nihon Corning Co., 1.1 mm in thickness) to a thickness of 1.0 $\mu$m, thereby forming a transparent negative type photoresist film 19.

Then, as shown in FIG. 4B, the negative type photoresist film 19 was selectively exposed, via an exposure photomask 20 having a predetermined pattern, to the light from an ultra-high pressure mercury lamp. Then, the negative type photoresist film 19 was subjected to a development using a hot water spray conditioned to a temperature of 40° C. and a pressure of 1.5 kg/cm² to obtain a transparent negative type photoresist pattern 21 as shown in FIG. 4C.

Then, as shown in FIG. 4D, the black coloring composition was spin-coated on the surface of a transparent glass substrate as well as on the transparent negative type photoresist pattern 21 to a thickness of 0.6 $\mu$m, thereby forming a film 22 all over the substrate. Thereafter, the substrate was dipped in an etching solution ($H_2O_2$+a sulfamic acid mixed solution) having a predetermined concentration for 60 to 80 seconds at a temperature of 60° C., thereby allowing the transparent negative type photoresist pattern 21 to swell and at the same time deteriorating the adhesion strength between the resist pattern 21 and the glass substrate 11 as shown in FIG. 4E.

Thereafter, the transparent negative type photoresist pattern 21 and the portion of the film 22 which was coated on the pattern 21 were concurrently removed by means of a high pressure spray of about 3.5 kg/cm², and then waterwashed. Subsequently, the substrate was dried using an air blower. It should be noted that it is also possible to completely and uniformly remove the resist by employing an oxygen plasma ashing method.

Finally, the substrate was heated for one hour in air atmosphere at a temperature of 330° C. by making use of an electric furnace, and then cooled down to room temperature. After being washed with water, the substrate was dried to obtain a light-shielding substrate 24 bearing a black light-shielding film 23 as shown in FIG. 4F. The black light-shielding film 23 of light-shielding substrate 24 obtained in this manner was 0.55 $\mu$m in film thickness, 1.2 in optical density, and $10^9$ $\Omega$·cm in volume resistivity. When the section of the black light-shielding film 23 was observed by means of TEM, the average particle diameter of the metal oxide constituting the color component was found kept remained as it was when the color component dispersion solution was prepared.

Example III-9

A light-shielding substrate was prepared in the same manner as explained in Example III-8 except that a transparent glass substrate (#1737, Nihon Corning Co., 1.1 mm in thickness) was substituted for the transparent glass substrate of Example III-8, and the heating in the electric furnace was performed at a temperature of 600° C. for one hour. The black light-shielding film of the light-shielding substrate thus obtained was found to have a film thickness of 0.50 $\mu$m, an optical density of 1.3, and a volume resistivity of $10^9$ $\Omega$·cm. Further, when the section of the black light-shielding film was observed by means of TEM, the average particle diameter of the metal oxide constituting the color component was found kept remained as it was when the color component dispersion solution was prepared.

Example III-10

A light-shielding substrate bearing a patterned black light-shielding film was prepared in the same manner as explained in Example III-8 except that the black coloring composition was prepared by adding 0.80 g of a 10 wt % butyl Cellosolve acetate solution of FC-430 (3M Co.) as a leveling agent to 100 g of the black coloring composition prepared in Example III-7.

The black light-shielding film of the light-shielding substrate thus obtained was found to have a film thickness of 0.55 $\mu$m, an optical density of 1.2, and a volume resistivity of $10^9$ $\Omega$·cm. Further, when the section of the black light-shielding film was observed by means of TEM, the average particle diameter of the metal oxide constituting the color component was found kept remained as it was when the color component dispersion solution was prepared.

Example III-11

A light-shielding substrate was prepared in the same manner as explained in Example III-10 except that a transparent glass substrate (#1737, Nihon Corning Co., 1.1 mm in thickness) was substituted for the transparent glass substrate of Example III-10, and the heating in the electric furnace was performed in a nitrogen gas atmosphere at a temperature of 600° C. for one hour. The black light-shielding film of the light-shielding substrate thus obtained was found to have a film thickness of 0.50 $\mu$m, an optical density of 1.3, and a volume resistivity of $10^9$ $\Omega$·cm. Further, when the section of the black light-shielding film was observed by means of TEM, the average particle diameter of the metal oxide constituting the color component was found kept remained as it was when the color component dispersion solution was prepared.

Example III-12

A light-shielding substrate was prepared by employing the same kind of black coloring composition as that of Example III-8 and in the same manner as explained in Example II-4.

First of all, as shown in FIG. 5A, a positive type photoresist OFPR-800 (Tokyo Ohka Co.) was coated on the surface of a transparent glass substrate 11 (#7059, Nihon Corning Co., 1.1 mm in thickness) to a thickness of 1.0 $\mu$m, thereby forming a resist film 26.

Then, as shown in FIG. 5B, this positive type photoresist film 26 was selectively exposed, via an exposure photomask 27 having a predetermined pattern, to a light of about 80 mJ/cm² (405 nm) in intensity by making use of an ultra-high pressure mercury lamp.

Then, the positive type photoresist film 26 was subjected to a paddle development using a positive type resist-developing liquid NMD-3 (Tokyo Ohka Co.), and water-sprayed to obtain a positive type resist pattern 28 as shown in FIG. 5C.

Then, as shown in FIG. 5D, the same black coloring composition as that of Example (III-8) was spin-coated on the surface of a transparent glass substrate as well as on the transparent positive type photoresist pattern 28 to a thickness of 0.6 $\mu$m, thereby forming a film 29 all over the substrate. Then, the transparent positive type photoresist pattern 28 was entirely exposed from the back surface of the glass substrate 11 to a light (405 nm) of about 200 mJ/cm$^2$ or more in intensity as shown in FIG. 5E.

Thereafter, the substrate was dipped in a positive type resist-developing liquid NMD-3 (Tokyo Ohka Co.) for about 30 seconds thereby to perform a paddle development and allowing the transparent positive type photoresist pattern 28 to be sufficiently swollen and dissolved.

Thereafter, the transparent positive type photoresist pattern 28 and the portion of the film 29 which was coated on the pattern 28 were concurrently removed by means of a high pressure spray of about 3.5 kg/cm$^2$, and then water-washed. Subsequently, the substrate was dried using an air blower. It should be noted that it is also possible to completely and uniformly remove the resist by employing an oxygen plasma ashing method.

Finally, the substrate was heated for one hour in air atmosphere at a temperature of 330° C. by making use of an electric furnace, and then cooled down to room temperature. After being washed with water, the substrate was dried to obtain a light-shielding substrate 31 bearing a black light-shielding film 30 as shown in FIG. 5F.

The black light-shielding film 30 of light-shielding substrate 31 obtained in this manner was 0.55 μm in film thickness, 1.2 in optical density, and 10$^9$ Ω·cm in volume resistivity. When the section of the black light-shielding film 30 was observed by means of TEM, the average particle diameter of the metal oxide constituting the color component was found kept remained as it was when the color component dispersion solution was prepared.

Example III-13

A light-shielding substrate was prepared in the same manner as explained in Example III-12 except that a transparent glass substrate (#1737, Nihon Corning Co., 1.1 mm in thickness) was substituted for the transparent glass substrate of Example III-12, and the heating in the electric furnace was performed at a temperature of 600° C. for one hour. The black light-shielding film of the light-shielding substrate thus obtained was found to have a film thickness of 0.50 μm, an optical density of 1.3, and a volume resistivity of 10$^9$ Ω·cm. Further, when the section of the black light-shielding film was observed by means of TEM, the average particle diameter of the metal oxide constituting the color component was found kept remained as it was when the color component dispersion solution was prepared.

Example III-14

An array substrate as shown FIG. 6 was prepared by employing the same kind of light-shielding substrate as that of Example III-8 and in the same manner as explained in Example II-7.

First of all, the light-shielding substrate prepared in Example (III-8) was washed and deposited with a protective film 33 (Si—O—N, etc.) about 500 nm in thickness by means of a plasma CVD method in order to prevent the diffusion of ions from the substrate.

Then, an Mo—Ta alloy film was deposited on the surface of this protective film 33 to a thickness of 300 nm by means of sputtering. Thereafter, the Mo—Ta alloy film was patterned by means of a photolithography treatment to form a source electrode 34, a drain electrode 35a and a drain line 35b.

Subsequently, a euamorphous silicon (α-Si) 100 nm in film thickness and SiN$_x$ (not shown) 50 nm in film thickness were successively deposited on the substrate by means of plasma CVD method, and then etched by making use of a photolithography, thereby obtaining a euamorphous silicon layer 37 of island shape.

Furthermore, an SiN$_x$ layer 350 nm in thickness was deposited on this euamorphous silicon layer 37 by means of plasma CVD method, and then an Al layer 300 nm in thickness and a Mo layer 50 nm in thickness were successively deposited on the SiN$_x$ layer by means of sputtering. Thereafter, the Al/Mo layers were etched by making use of a photolithography, thereby obtaining a gate electrode 39a and a gate line 39b. Then, the SiN$_x$ layer was patterned by means of a selective dry etching method thereby to form a gate insulating film 40.

Then, an n$^+$-type semiconductor layer 38 was formed by way of ion doping method using a phosphine gas in order to form an ohmic contact at the contacting portions between the source electrode 34 and the euamorphous silicon layer 37, and between the drain electrode 35a and the euamorphous silicon layer 37. Thereafter, a passivation film (SiN$_x$) 41 having a thickness of 200 nm was formed over the gate electrode 39a and the gate line 39b by means of a plasma CVD method.

In order to form a contact between the source electrode 34 and the pixel electrode, a portion of the passivation film (SiN$_x$) 41 was patterned by means of photolithography. Finally, an ITO was formed by means of sputtering and then patterned by means of photolithography to form a transparent pixel electrode 42, thus obtaining an array substrate.

In the aforementioned manufacturing process of an array substrate, the light-shielding substrate was exposed to a reduced pressure condition at the occasion of the plasma CVD, any problem such as degassing was not raised. Further, the discoloration of the black light-shielding film 16 was not admitted at all even after the high temperature processing of about 300° C. at the occasion of forming the α-Si film.

Example III-15

An array substrate as shown FIG. 7 was prepared by employing the same kind of light-shielding substrate as that of Example III-8 and in the same manner as explained in Example II-8.

First of all, the light-shielding substrate prepared in Example (III-8) was washed and deposited with a protective film 33 (Si—O—N, etc.) about 500 nm in thickness by means of a plasma CVD method in order to prevent the diffusion of ions from the substrate.

Then, an Mo—Ta alloy film was deposited on the surface of this protective film 33 to a thickness of 300 nm by means of sputtering. Thereafter, the Mo—Ta alloy film was patterned by means of a photolithography treatment to form a source electrode 34, a drain electrode 35a and a drain line 35b.

Subsequently, a euamorphous silicon (α-Si) 100 nm in film thickness and SiN$_x$ (not shown) 50 nm in film thickness were successively deposited on the substrate by means of plasma CVD method, and then etched by making use of a photolithography, thereby obtaining a euamorphous silicon layer 37 of island shape.

Furthermore, an SiN$_x$ layer 350 nm in thickness was deposited on this euamorphous silicon layer 37 by means of plasma CVD method, and then an Al layer 300 nm in thickness and a Mo layer 50 nm in thickness were successively deposited on the SiN$_x$ layer by means of sputtering.

Thereafter, the Al/Mo layers were etched by making use of a photolithography, thereby obtaining a gate electrode 39a and a gate line 39b. Then, the SiN$_x$ layer was patterned by means of a selective dry etching method thereby to form a gate insulating film 40.

Then, an n$^+$-type semiconductor layer 38 was formed by way of ion doping method using a phosphine gas in order to form an ohmic contact at the contacting portions between the source electrode 34 and the euamorphous silicon layer 37, and between the drain electrode 35a and the euamorphous silicon layer 37.

Thereafter, a passivation film (SiN$_x$) 41 having a thickness of 200 nm was formed over the gate electrode 39a and the gate line 39b by means of a plasma CVD method. Subsequently, a resist (HRC-104, Nihon Gosei Gomu Co.) was spin-coated over the surface of substrate to form a resist film 2 μm in film thickness. In order to form a contact between the source electrode 34 and the pixel electrode, this resist film was then subjected to a sequence of exposure, development and selective etching thereby forming a contact hole in the passivation film (SiN$_x$) 41.

Subsequently, the resist film remaining on the passivation film (SiN$_x$) 41 was heated to a temperature of 160° C. so as to completely decompose the sensitizer and at the same time to crosslink the polymer, thus forming a colorless transparent insulating film 43. Finally, an ITO was formed by means of sputtering and then patterned by means of photolithography to form a transparent pixel electrode 42, thus obtaining an array substrate.

In the aforementioned manufacturing process of an array substrate, the light-shielding substrate was exposed to a reduced pressure condition at the occasion of the plasma CVD, any problem such as degassing was not raised. Further, the discoloration of the black light-shielding film 16 was not admitted at all even after the high temperature processing of about 300° C. at the occasion of forming the α-Si film.

Example III-16

An array substrate as shown FIG. 8 was prepared by employing the same kind of light-shielding substrate as that of Example III-9 and in the same manner as explained in Example II-9.

First of all, the light-shielding substrate prepared in Example (III-9) was washed and deposited with a protective film 33 (Si—O—N, etc.) about 500 nm in thickness by means of a plasma CVD method in order to prevent the diffusion of ions from the substrate.

Then, a euamorphous silicon (α-Si) 100 nm in film thickness and SiN$_x$ (not shown) 50 nm in film thickness were successively deposited on the protective film 33 by means of plasma CVD method, and then etched by making use of a photolithography, thereby obtaining a euamorphous silicon layer of island shape. This euamorphous silicon layer was then annealed at a temperature of 600° C. in an electric furnace thereby crystallizing the euamorphous silicon layer to form a eupolycrystalline silicon layer 46.

Furthermore, an insulating film 47 350 nm in thickness which is formed of SiN$_x$ and functioning also as a gate insulating film was deposited on this eupolycrystalline silicon layer 46 by means of plasma CVD method, and then an Al layer 300 nm in thickness and a Mo layer 50 nm in thickness were successively deposited on the insulating film 47 by means of sputtering. Thereafter, the Al/Mo layers were etched by making use of a photolithography, thereby obtaining a gate electrode 48a and a gate line 48b.

Then, an insulating film (SiO$_x$) 49 to be interposed between any one of the gate electrode 48a and gate line 48b and any one of the source electrode, drain electrode and drain lines was formed to a thickness of 200 nm by means of plasma CVD method. In order to form a contact between the source and drain electrodes and the eupolycrystalline silicon (p-Si) layer 46, contact holes were formed in these insulating films 47 and 49 by means of a selective etching method.

Then, an n$^+$-type semiconductor layer 50 was formed by way of ion doping method using a phosphine gas in order to form an ohmic contact at the contacting portions between the source electrode and the eupolycrystalline silicon layer 46, and between the drain electrode and the eupolycrystalline silicon layer 46.

Then, an Mo—Ta alloy film was deposited on the surface of this insulating film 49 to a thickness of 500 nm by means of sputtering. Thereafter, the Mo—Ta alloy film was patterned by means of a photolithography treatment to form a source electrode 51, a drain electrode 52a and a drain line 52b.

Then, a resist film was formed to cover the source electrode 51, the drain electrode 52a and the drain line 52b. After an ITO was formed all over the surface of the resist film by means of sputtering, a transparent pixel electrode 54 was formed by removing the resist film, i.e. lift-off method.

Finally, an SiN$_x$ film having a thickness of 200 nm was formed by means of a plasma CVD method, and patterned by means of photolithography so as to expose the transparent pixel electrode 54 and to form a passivation film 53, thus obtaining an array substrate.

In the aforementioned manufacturing process of an array substrate, the light-shielding substrate was exposed to a reduced pressure condition at the occasion of the plasma CVD, any problem such as degassing was not raised. Further, the discoloration of the black light-shielding film 16 was not admitted at all even after the high temperature processing of about 300° C. at the occasion of forming the α-Si film or even after the annealing of the α-Si film at a temperature of 600° C.

Example III-17

An array substrate as shown FIG. 9 was prepared by employing the same kind of light-shielding substrate as that of Example III-9 and in the same manner as explained in Example II-10.

First of all, the light-shielding substrate prepared in Example (III-9) was washed and deposited with a protective film 33 (Si—O—N, etc.) about 500 nm in thickness by means of a plasma CVD method in order to prevent the diffusion of ions from the substrate.

Then, a euamorphous silicon (α-Si) 100 nm in film thickness and SiN$_x$ (not shown) 50 nm in film thickness were successively deposited on the protective film 33 by means of plasma CVD method, and then etched by making use of a photolithography, thereby obtaining a euamorphous silicon layer of island shape. This euamorphous silicon layer was then annealed at a temperature of 600° C. in an electric furnace thereby crystallizing the euamorphous silicon layer to form a eupolycrystalline silicon layer 46.

Furthermore, an insulating film 47 350 nm in thickness which is formed of SiN$_x$ and functioning also as a gate insulating film was deposited on this eupolycrystalline silicon layer 46 by means of plasma CVD method, and then an Al layer 300 nm in thickness and a Mo layer 50 nm in thickness were successively deposited on the insulating film 47 by means of sputtering. Thereafter, the Al/Mo layers were etched by making use of a photolithography, thereby obtaining a gate electrode 48a and a gate line 48b.

Then, an insulating film ($SiO_x$) 49 to be interposed between any one of the gate electrode 48a and gate line 48b and any one of the source electrode, drain electrode and drain lines was formed to a thickness of 200 nm by means of plasma CVD method. In order to form a contact between the source and drain electrodes and the eupolycrystalline silicon (p-Si) layer 46, contact holes were formed in these insulating films 47 and 49 by means of a selective etching method.

Then, an $n^+$-type semiconductor layer 50 was formed by way of ion doping method using a phosphine gas in order to form an ohmic contact at the contacting portions between the source electrode and the eupolycrystalline silicon layer 46, and between the drain electrode and the eupolycrystalline silicon layer 46.

Then, an Mo—Ta alloy film was deposited on the surface of this insulating film 49 to a thickness of 500 nm by means of sputtering. Thereafter, the Mo—Ta alloy film was patterned by means of a photolithography treatment to form a source electrode 51, a drain electrode 52a and a drain line 52b.

Thereafter, a passivation film ($SiN_x$) 53 having a thickness of 200 nm was formed over the source electrode 51, drain electrode 52 and the drain line 52b by means of a plasma CVD method. Subsequently, a resist (HRC-104, Nihon Gosei Gomu Co.) was spin-coated over the surface of substrate to form a resist film 2 μm in film thickness. In order to form a contact between the source electrode 51 and the pixel electrode, this resist film was then subjected to a sequence of exposure, development and selective etching thereby forming a contact hole in the passivation film ($SiN_x$) 53.

Subsequently, the resist film remaining on the passivation film ($SiN_x$) 53 was heated to a temperature of 160° C. so as to completely decompose the sensitizer and at the same time to crosslink the polymer, thus forming a colorless transparent insulating film 55. Finally, an ITO was formed by means of sputtering and then patterned by means of photolithography to form a transparent pixel electrode 54, thus obtaining an array substrate.

In the aforementioned manufacturing process of an array substrate, the light-shielding substrate was exposed to a reduced pressure condition at the occasion of the plasma CVD, any problem such as degassing was not raised. Further, the discoloration of the black light-shielding film 23 was not admitted at all even after the high temperature processing of about 300° C. at the occasion of forming the α-Si film or even after the annealing of the α-Si film at a temperature of 600° C.

Example III-18

A solvent-soluble polyimide varnish was coated on the array substrate prepared in Example (III-14), and the resultant surface of the substrate was successively subjected to a heat treatment and a rubbing treatment to form a liquid crystal alignment film.

On the other hand, a color filter was formed on a transparent glass substrate in the conventional manner, and then ITO film was deposited on the color filter by way of sputtering thereby forming a counter electrode. Then, a solvent-soluble polyimide varnish was coated on the ITO film, and then subjected successively to a heat treatment and a rubbing treatment, thereby obtaining a color filter substrate provided with a liquid crystal alignment film.

Then, these color filter substrate and the array substrate were superimposed in such a manner that both of the liquid crystal alignment films of these substrates face to each other at a distance of 5 μm with a spacer being interposed therebetween. After the periphery of the superimposed body was sealed thereby to form a liquid crystal cell, 6CB (4,4'-hexylcyanobiphenyl) was charged as a liquid crystal into the liquid crystal cell, thereby forming a liquid crystal display device. When the voltage retention of the resultant liquid crystal display device was measured at room temperature, a value of 98% was obtained indicating an excellent voltage retention.

Examples III-19 to III-21

The liquid crystal display devices of Examples III-19 to III-21 were respectively prepared in the same manner as explained in Example III-18 except that the array substrates prepared in Examples III-15 to III-17 were substituted for the array substrate of Example III-18.

When the voltage retention of each of the resultant liquid crystal display devices was measured at room temperature, each of the resultant liquid crystal display devices exhibited a value of 98%, indicating an excellent voltage retention.

The liquid crystal display element prepared by making use of the array substrate prepared in Example III-17 was constructed as shown in FIG. 10.

Comparative Example III-1

A black matrix pigment dispersion resist (CK2000, Fuji Hant Co.) was coated on a glass substrate by making use of a spinner, and then pre-baked for 10 minutes at a temperature of 120° C. to obtain a light-shielding film having a thickness of 0.6 μm. The light-shielding film thus obtained indicated a volume resistivity of as high as $10^{13}$ Ω·cm. However, when this light-shielding film was heated at a temperature of 600° C. for 30 minutes, the film was decomposed, indicating that this film was not applicable to a black matrix-on array substrate.

Comparative Example III-2

10.0 g of M silicate 51 (Tama Kagaku Co.) and 5.0 g of methyltriethoxysilane were dissolved in a mixed solvent comprising 15.0 g of isopropyl alcohol and 5.0 g of n-butanol, and then 5.0 g of water was further added thereto to obtain a mixed solution. After being sufficiently stirred, the mixed solution was further added with 0.06 g of concentrated nitric acid and the resultant solution was heated at a temperature of 60° C. for one hour, after which the mixed solution was quenched down to room temperature. Then, 5.0 g of isopropanol and 15.0 g of n-butanol were added to the mixed solution to obtain a solution of silicon-based high molecular compound.

Then, 10.0 g of this silicon-based high molecular compound solution and 10.0 g of an alcohol dispersion solution of carbon black (0.3 μm in average particle diameter, 25 wt % in concentration of carbon black, Fuji Shikiso Co.) were mixed together to obtain a black coloring composition.

The black coloring composition was coated on a glass substrate by making use of a spinner, and then pre-baked for 10 minutes at a temperature of 120° C. to obtain a light-shielding film having a thickness of 0.6 μm. The light-shielding film thus obtained indicated a volume resistivity of as low as $10^5$ Ω·cm. When this light-shielding film was heated at a temperature of 600° C. in a nitrogen atmosphere for 30 minutes, the shape of the film having a thickness of 0.5 μm was maintained, but the volume resistivity of the resultant film was decreased down to $10^3$ Ω·cm.

In the aforementioned examples, the formation of a light-shielding film with the black coloring composition of this invention was performed by coating the black coloring composition on the surface of a glass substrate by means of a spin coating method for instance. However, the employment of the black coloring composition of this invention is not limited to such a case where a uniform coating is desired, but is also applicable to the formation of letter or picture on a substrate as in the case a printed matter.

As illustrated in the above examples, it is possible to provide a black coloring composition which is excellent in staining power and adhesion, and can be stably preserved for a long period of time. Therefore, it is possible with this coloring composition to manufacture a black film which is excellent in color purity and can be applicable in various fields.

It will be understood that if a color component consisting of a specific kind of metal oxide is included into a silicon matrix having a three-dimensional structure comprising a Si—O—Si bond, or into an inorganic oxide glass comprising at least one kind of oxide selected from aluminum oxide and silicon oxide, or into a silicon carbide-based matrix having a three-dimensional structure comprising a S—C bond, it is possible to provide a light-shielding film which is high in electric resistance and excellent in heat resistance.

As explained above, it is possible according to this invention to provide a light-shielding component which is high in electric resistance and excellent in heat resistance, and hence suited for use as a black matrix of an array substrate, and to provide a black coloring composition which is suited for use in the manufacture of such a light-shielding component. Since the black coloring composition of this invention is excellent in tinting strength and in adhesion, it is possible to stably store the black coloring composition for a long period of time. Therefore, it is possible with the employment of the black coloring composition of this invention to form a black film which is excellent in hue and applicable to various fields.

In particular, if the light-shielding component of this invention is employed as a light-shielding film or as a black matrix, it is possible to manufacture an array substrate or a liquid crystal display device which is high in opening ratio and low in power consumption and hence can be manufactured at a low cost. Therefore, this invention would be very valuable in industrial view-point.

Additional advantages and modifications will readily occur to those skilled in the art. Therefore, the invention in its broader aspects is not limited to the specific details, and representative embodiments shown and described herein. Accordingly, various modifications may be made without departing from the spirit or scope of the general inventive concept as defined by the appended claims and their equivalents.

We claim:

1. A black coloring composition comprising;
   a black inorganic pigment formed of an oxide having an average particle diameter of 0.5 μm or less and comprising at least one kind of metal selected from metals belonging to Groups 4 to 11 and also to the fourth period;
   at least one kinds of dispersant selected from the group consisting of polyvinyl butyral resin represented by the following general formula (1), and a polyacrylic resin represented by the following general formula (2); and an organic solvent:

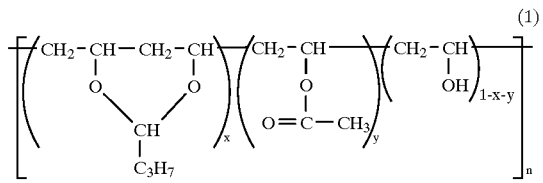

wherein x=0.01 to 0.9; y≦0.05; and n is an integer;

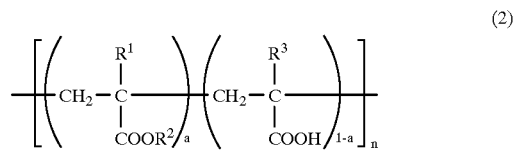

wherein $R^1$ is selected from the group consisting of a hydrogen atom, a substituted or unsubstituted aliphatic hydrocarbon group and a substituted or unsubstituted aromatic hydrocarbon group; $R^2$ is selected from the group consisting of a substituted or unsubstituted aliphatic hydrocarbon group and a substituted or unsubstituted aromatic hydrocarbon group; $R^3$ is selected from the group consisting of a hydrogen atom, a substituted or unsubstituted aliphatic hydrocarbon group and a substituted or unsubstituted aromatic hydrocarbon group; a=0 to 0.9; and n is an integer.

2. The black coloring composition according to claim 1, which further comprises at least one kind of compound selected from a metal alkoxide and a hydrolysate of said metal alkoxide.

3. A black coloring composition comprising;
   a black inorganic pigment formed of a metal oxide comprising at least one kind of metal selected from metals belonging to Groups 4 to 11 and also to the fourth period;
   an organosilicic high molecular compound represented by the following general formula (7);
   a dispersant; and
   an organic solvent:

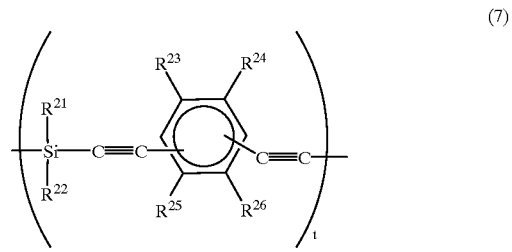

wherein $R^{21}$, $R^{22}$, $R^{23}$, $R^{24}$, $R^{25}$ and $R^{26}$ may be the same or different and are individually a hydrogen atom, a substituted or unsubstituted aliphatic hydrocarbon radical, or a substituted or unsubstituted aromatic hydrocarbon radical; and t is an integer of 2 or more.

4. The black coloring composition of claim 1, wherein said dispersant comprises said polyvinyl butyral resin represented by said general formula (I).

5. The black coloring composition according to claim 1, wherein said organic solvent is selected from the group consisting of methanol, ethanol, isopropyl alcohol, butanol, ethylene glycol monoethyl ether, tetrahydrofuran, ethylene glycol diethyl ether, diethylene glycol diethyl ether and mixtures thereof.

6. The black coloring composition according to claim 4, wherein said organic solvent is selected from the group consisting of methanol, ethanol, isopropyl alcohol, butanol, ethylene glycol monoethyl ether, tetrahydrofuran, ethylene glycol diethyl ether, diethylene glycol diethyl ether and mixtures thereof.

7. A black coloring composition comprising:
- a black inorganic pigment formed of an oxide having an average particle diameter of 0.5 µm or less and at least one metal oxide selected from metals belonging to Groups 4 to 11 and also to the fourth period;
- at least one dispersant represented by the following general formula (3):

$$R^4COOH$$

wherein $R^4$ is a substituted or an unsubstituted aliphatic hydrocarbon group having 12 or more carbon atoms; and
- an organic solvent selected from the group consisting of methanol, ethanol, isopropyl alcohol, butanol, ethylene glycol monoethyl ether, tetrahydrofuran, ethylene glycol diethyl ether, diethylene glycol diethyl ether and mixtures thereof.

* * * * *